United States Patent [19]
Yamamoto et al.

[11] Patent Number: 5,392,132
[45] Date of Patent: Feb. 21, 1995

[54] FACSIMILE MACHINE

[75] Inventors: Taiji Yamamoto; Yoshimi Kamimoto; Toshitaka Nakagawa; Yutaka Uehara; Ryuji Hosaka, all of Saitama, Japan

[73] Assignee: Fuji Xerox Co., Ltd., Tokyo, Japan

[21] Appl. No.: 925,012

[22] Filed: Aug. 5, 1992

[30] Foreign Application Priority Data

Aug. 9, 1991 [JP] Japan ................................. 3-223546

[51] Int. Cl.$^6$ .......................... H04N 1/00; H04N 1/32
[52] U.S. Cl. .................................. 358/407; 358/434; 358/473
[58] Field of Search ............... 358/400, 407, 408, 434, 358/436, 442, 473

[56] References Cited

U.S. PATENT DOCUMENTS

| | | | |
|---|---|---|---|
| 4,558,369 | 12/1985 | Shinahora et al. | 358/257 |
| 4,586,086 | 4/1986 | Ohzeki | 358/256 |
| 5,146,348 | 9/1992 | Kanetama | 358/407 |
| 5,172,243 | 12/1992 | Hatashi et al. | 358/400 |
| 5,175,634 | 12/1992 | Matsuzaki | 358/407 |
| 5,196,843 | 3/1993 | Toshino | 358/407 |

FOREIGN PATENT DOCUMENTS

| | | |
|---|---|---|
| 55-14626 | 7/1978 | Japan . |
| 63-193658 | 8/1988 | Japan . |
| 2-33227 | 2/1990 | Japan . |
| 2-49264 | 4/1990 | Japan . |

Primary Examiner—Vit W. Miska
Attorney, Agent, or Firm—Finnegan, Henderson Farabow, Garrett & Dunner

[57] ABSTRACT

A facsimile machine for facsimile communication with another facsimile machine comprises a host machine including processor for processing data; at least one handy-scanner provided separately from the host machine, for scanning an original document, the handy-scanner including reader for reading image data from the original document, and first transmitter for transmitting the image data read by the reader; and at least one relay station for relaying data signals between the host machine and the handy-scanner, the relay station including second transmitter for transmitting the data received from the first transmitter of the handy-scanner to the host machine, and a buffer memory for temporarily storing the image data before the second transmitter transmits the image data to the host machine, the host machine processing the image data transmitted by the second transmitter.

15 Claims, 34 Drawing Sheets

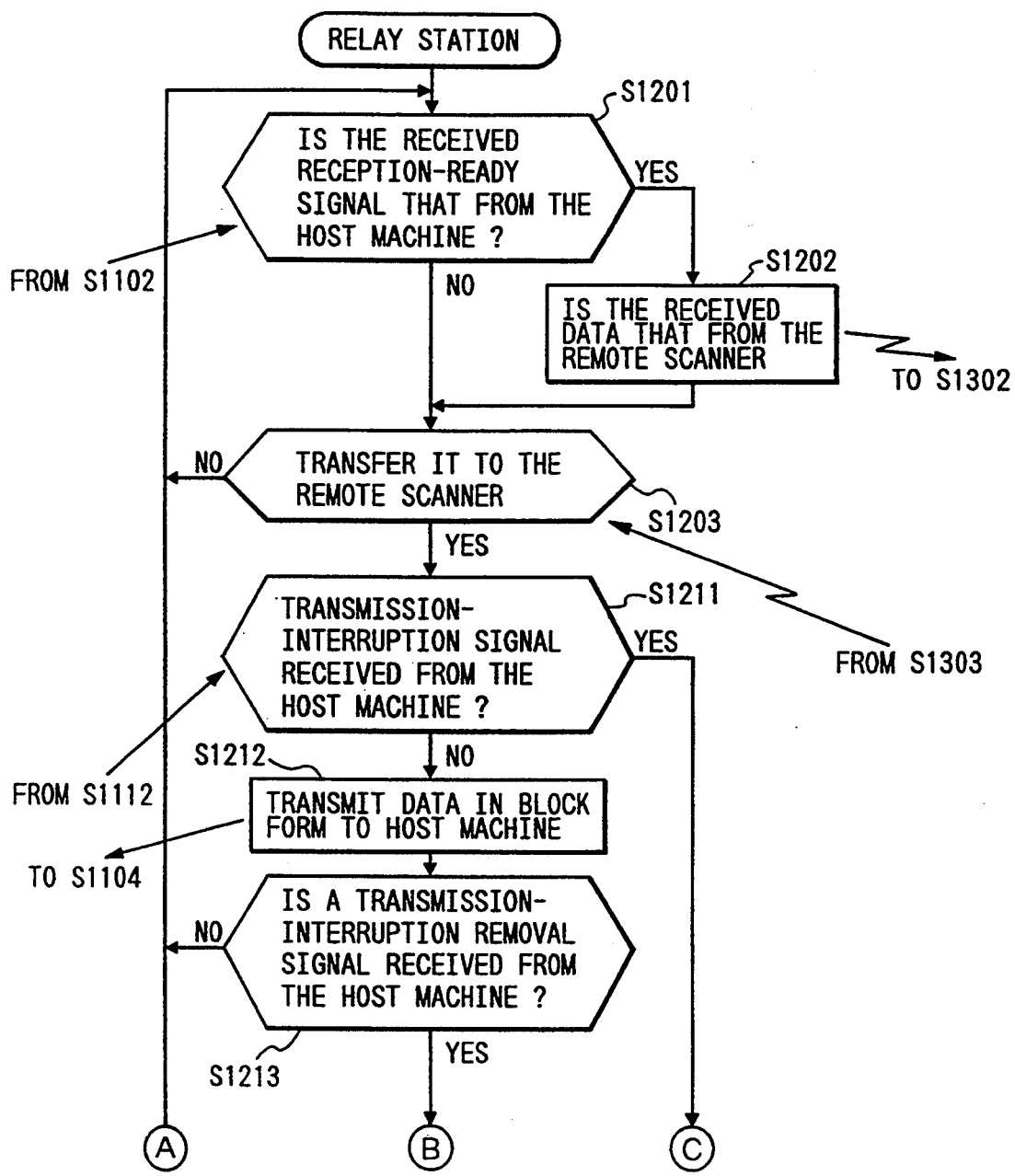

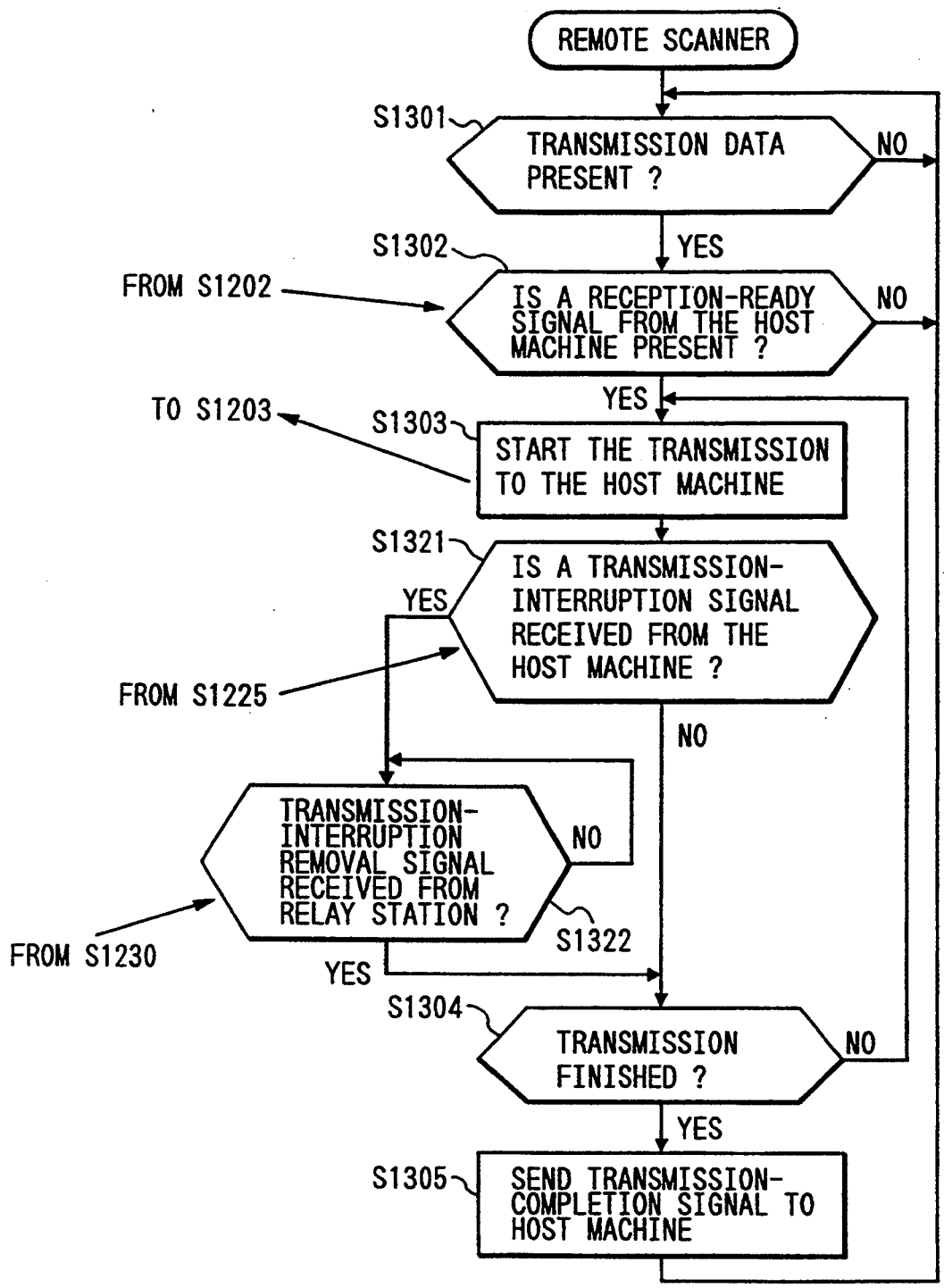

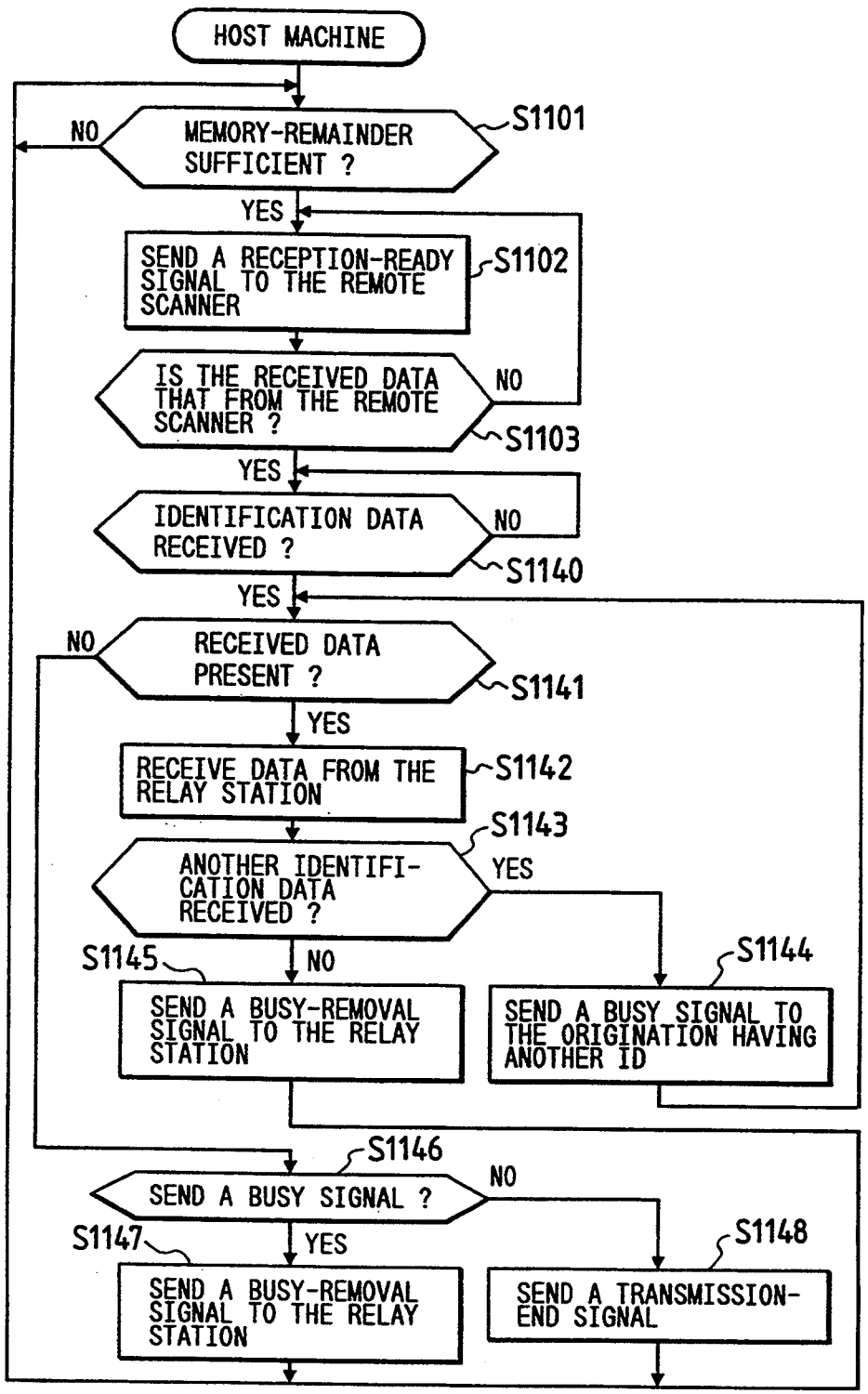

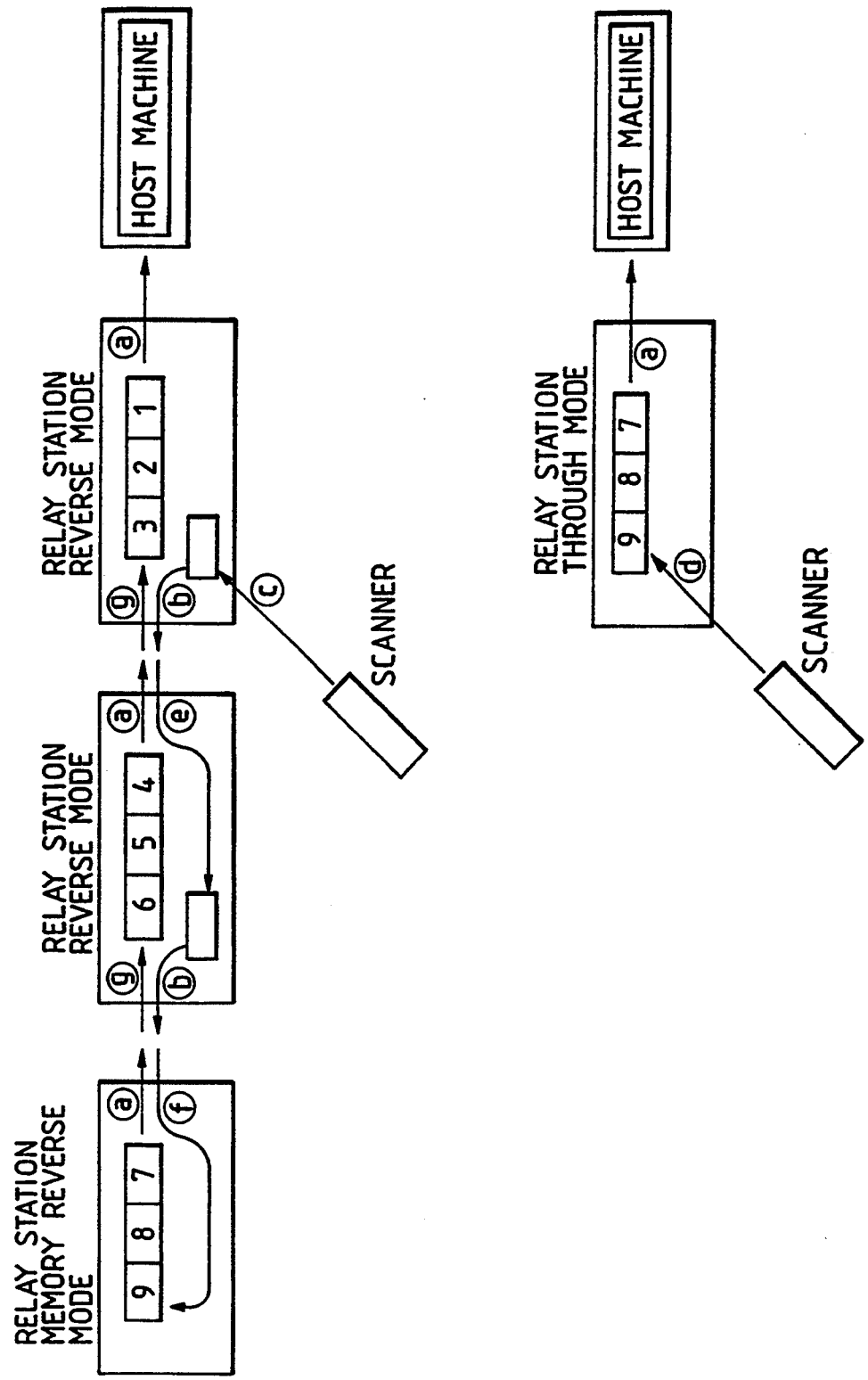

| FIG. 21A | FIG. 21B | FIG. 21C |

FACSIMILE MACHINE

BACKGROUND OF THE INVENTION

1. Field of the Invention

The present invention relates to an image input system for an facsimile machine, and more particularly to a facsimile machine having a host section and a scanner section provided separately from the host machine, in which the scanner section reads image data and transmits it to the host section, and the host section executes a facsimile communication.

2. Prior Art

Facsimile machines exist that consist of a host section (referred to as a host machine) for carrying out the major facsimile operations, e.g., transmission/reception of image data, and a small image reader, which is separable from the host machine. This type of facsimile machine is used mainly for reading a part of a large original document, for example, newspaper, or one page of a bulky volume. As the small image reader of this type, an a handy scanner based on an image sensor is known.

The conventional handy scanner must be handled while dragging signal and power supply cables connected thereto. Accordingly, it is unhandy.

Japanese Utility Model Laid-Open Publication No. Sho. 55-14626, for example, discloses a technique to solve the above problem. In the technique, image data read by the scanner is wirelessly transmitted to a plotter.

The application of such a wireless communication to a facsimile machine is also disclosed in Japanese Patent Laid-Open Publication No. Sho. 63-193658. In the publication, a handy-scanner, battery-driven, includes an image memory for storing image data that is read, and transfer means for wirelessly transferring the image data of the memory to a host machine. A host machine transmits the received image data to an intended called party in a facsimile mode.

In the facsimile machine of the type in which the host machine and the handy-scanner are separately provided, the handy-scanner is of the codeless type, and hence its handling is very easy.

Japanese Utility Model Laid-Open Publication No. Hei. 2-49264 discloses a technique in which a telephone function part of the facsimile machine is used as a cordless telephone, and with the cordless telephone the facsimile machine is remotely operated for transmission and reception.

In the prior art, an optical communication using photo diodes or a wireless communication in which a carrier signal is modulated by image data and is transmitted in the form of radio wave, is used for communication between the facsimile terminals. The directivity in the radio-wave communication is lower than that in the optical communication. Accordingly, it is relatively easy to intercept the radio-wave communication. In this respect, to keep a secret it is preferable to employ the optical communication.

However, the optical communication has a disadvantage in that an obstacle, if present between light emitting and receiving ends, will intercept a light signal between them.

SUMMARY OF THE INVENTION

Accordingly, the present invention has been made in view of the above circumstances and has an object to provide a facsimile machine which ensures a reliable transmission of image data between a host machine and a handy-scanner even if an obstacle is present between them.

To achieve the above object, there is provided an input system for a facsimile machine in which a host machine and a scanner terminal for reading image data provided separately from the host machine, the image data read by the scanner terminal is wirelessly transmitted to the host machine, and the host machine transmits the received image data, the facsimile machine comprising:

(1) a plurality of terminals for receiving image data from the scanner terminal in an optical communication manner and transmitting the received image data to the host machine in a wire communication manner, and select means for selectively connecting one of the terminals according to the signal levels of the signals output from the terminals.

(2) The facsimile machine further comprises a plurality of relay stations each for optically receiving image data from the scanner terminal and optically transferring the received image data to the terminals.

(3) Each relay station contains an image memory. When the image memory of the host machine is in a memory-full state, the relay station temporarily stores the image data received from the scanner terminal into the image memory of the relay station per se. When the memory-full state of the image memory of the host machine is removed, the relay station reads the image data out of the image memory and transfers it to the terminal.

(4) Each relay station contains means for detecting the remaining memory capacity of the image memory of another relay station, and stores the detect result. When the relay station receives image data in a state that the image memory of the relay station itself is in a memory-full state, the relay station optically transfers the received image data to another relay station of which the image memory is not full.

(5) Each relay station stores the image data received from the scanner terminal and identification data as well. When the relay station is receiving image data, if its image memory becomes full, the relay station transfers the remaining image data, together with identification data, to another relay station of which the image memory is not full.

With the construction (1) above, image data can be transmitted from the scanner terminal to the host machine by way of the terminal properly selected. In a circumstance where many obstacles are present, if an obstacle is present between the scanner terminal and a terminal, an operator handling the scanner terminal searches another terminal having no obstacle present in the course continuous to the scanner terminal, and turns the scanner terminal to the new terminal. In this way, the image data can reliably be transmitted to the host machine, from the scanner terminal.

With the construction (2), a service area of the scanner terminal can be enlarged if a plurality of relay stations are installed since the relay station relays image data from the scanner terminal to the host machine (terminal).

With the construction (3), when the memory-remainder of the image memory in the host machine is insufficient, the relay station temporarily stores the image data received from the scanner terminal. When the image memory of the host machine restores to have the sufficient amount of memory-remainder, the relay station reads the image data out of the image memory, and transfers it to the host machine 2.

With the construction (4), when the relay station is receiving image data, if the memory-remainder of the image memory in the relay station is insufficient, the subsequently incoming image data is transferred to another relay station of which the image memory is not full. Accordingly, the relay station can continuously receive the signal from the scanner terminal even if the image memory of the relay station per se is in a memory-full state.

With the construction (5), when the relay station is receiving image data from the scanner terminal, if the image memory of the relay station becomes full, the image data subsequently received is transferred to another relay station. The new relay station consecutively receives the subsequent image data.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 20 is an explanatory diagram showing an image data transmission flow between the relay stations;

DETAILED DESCRIPTION OF THE PREFERRED EMBODIMENTS

Figure 1:
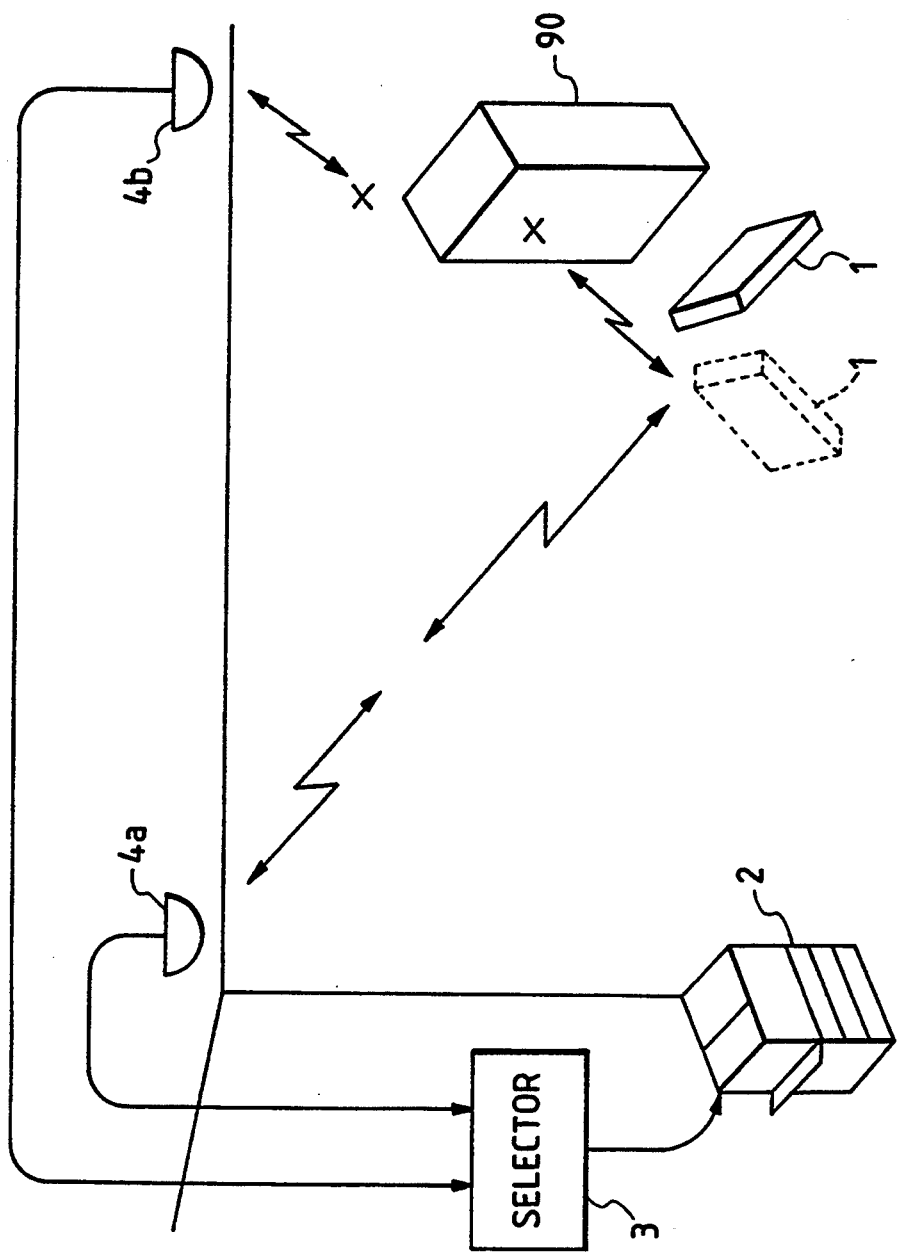
FIG. 1 is a diagram showing a facsimile machine according to a first embodiment of the present invention.

The embodiments of the present invention, which are believed to be preferred, will be described with reference to the accompanying drawings. Throughout the drawings, like reference numerals and characters will be used for designating like or equivalent portions, for clarity and simplicity.

FIG. 1 is a diagram showing a facsimile machine according to a first embodiment of the present invention.

As shown, a host machine 2 of a facsimile machine is connected to two terminals 4a and 4b by way of a selecting portion 3. The selecting portion 3 detects levels of signals output from the terminals 4a and 4b, selects the signal of the larger level and sends it to the host machine 2. The host machine 2 receives the signal selected by the selecting portion 3 and executes a prescribed facsimile processing.

Figure 2:
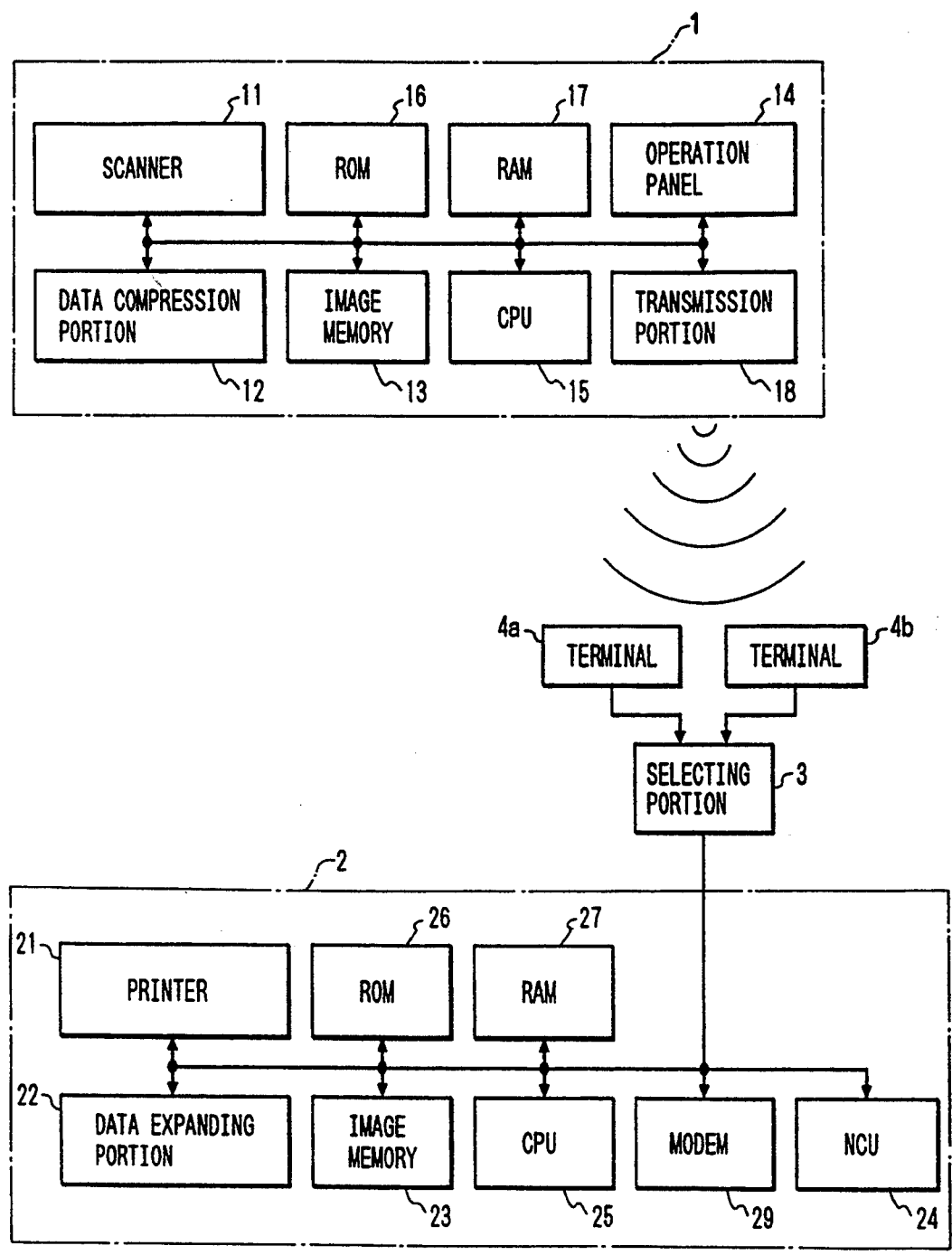
FIG. 2 is a block diagram showing the arrangement of the facsimile machine of the first embodiment.

FIG. 2 is a block diagram functionally showing the facsimile machine. The facsimile machine contains all the components necessary for the facsimile machine, but only the components essential to the present invention are illustrated here, for simplicity.

A scanner 11 of a handy-scanner 1 reads image information on an original document and converts it into an electrical data signal. A data compressing portion 12 encodes the image data and compresses it. The image data compressed is stored into the image memory 13. An operation panel 14 includes ten keys and a display window. A ROM 16 stores control programs and various types of basic data.

A system control portion (CPU) 15 controls the overall operation of the handy-scanner 1 according to various types of control programs that are stored in the ROM 16. A RAM 17 provides a work area, and stores data input by an operator on the operation panel 14. A transmitting portion 18 converts image data into a light signal, and transmits it in the form of the light signal.

In the host machine 2, an image memory 23 stores image data that is received from the handy-scanner 1 or another facsimile terminal. A data expanding portion 22 decodes coded image data and expands it. A modem 29 modulates the image data before it is transmitted to the other end and demodulates the image data that is received from the other end.

A line control portion or network control unit (NCU) 24 automatically calls the telephone number of a called party, and executes a predetermined communication procedure according to a given protocol. A printer 21 prints out the received image data on a recording paper. A CPU 25 controls the overall operation of the host machine 2. A ROM 26 stores control programs for operating the present system and various types of basic data. A RAM 27 provides a work area.

Figure 3:
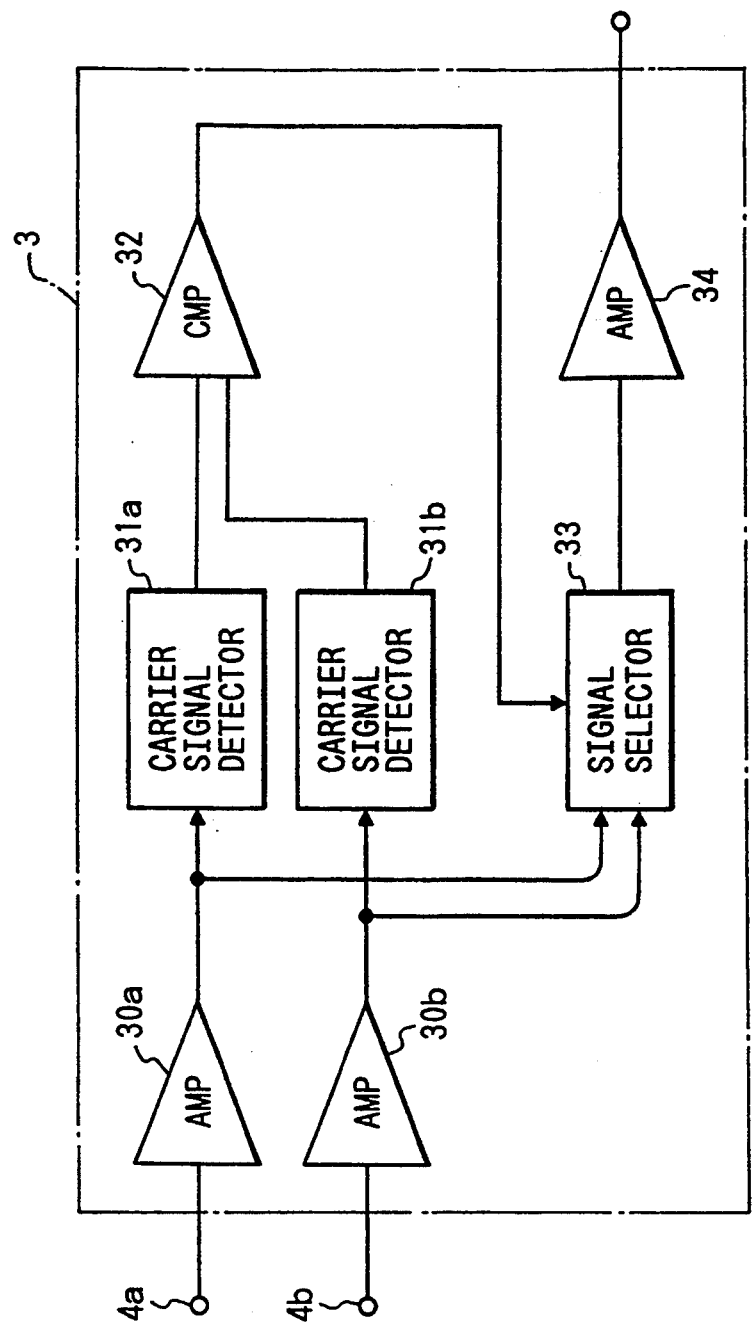
FIG. 3 is a block diagram showing a selecting portion in the facsimile machine.

FIG. 3 is a block diagram showing a specific arrangement of the selecting portion 3.

A signal output from the terminal 4a is input to an input signal amplifier 30a. A signal output from the terminal 4b is input to another input signal amplifier 30b. The amplifiers 30a and 30b amplify input signals and transmit them to carrier signal detectors 31a and 31b, respectively. Each carrier signal detector detects a carrier signal from the input signal, and applies it to a comparator 32.

The comparator 32 compares the levels of the received carrier signals with each other, and transfers the result of comparison to a signal selector 33. The signal selector 33 selects the signal of the larger level, and outputs it to an output signal amplifier 34. The amplifier 34 amplifies the input signal into a signal of a predetermined level.

With such an arrangement, as shown in FIG. 1, when an operator directs the handy-scanner 1 toward the terminal 4b and sends data to the terminal 4b, an obstacle 90 intercepts a light signal carrying the data that is emitted from the handy-scanner 1. To avoid this, he turns and directs the handy-scanner 1 toward the terminal 4a. In this case, the light signal is also received by the terminal 4b. However, the signal level of the signal received by the terminal 4b is lower than that received by the terminal 4a. The selecting portion 3 selects the signal of the larger level, viz., the signal output from the terminal 4a, and sends it to the host machine 2.

In the present embodiment, a plurality of the terminals, distantly located, intervene in the transmission of image data from the handy-scanner 1 to the host machine 2. In a case where an obstacle is present between the handy-scanner and one terminal, an operator searches another terminal having no obstacle present between the terminal itself and the handy-scanner handled by the operator, and directs the handy-scanner toward the new terminal. Accordingly, even in such a circumstance where many obstacles are present, the reliable transmission of image data is secured.

An area where the handy-scanner 1 is available can be increased by increasing the number of terminals and/or installing the terminals in a larger area. However, the distance between the host machine 2 and the terminal generally designated by reference numeral 4 is preferably short as possible because the terminals 4 and the host machine 2 are connected by wires. Use of a number of terminals makes the construction of the selecting portion 3 complicated. For the above reasons, there is a limit in increasing the number of terminals 4 and the area where the terminals are installed. Accordingly, the service area by the handy-scanner is also limited.

In a second embodiment of the invention to be described hereafter, the problems as just mentioned have been successfully solved.

Figure 4:
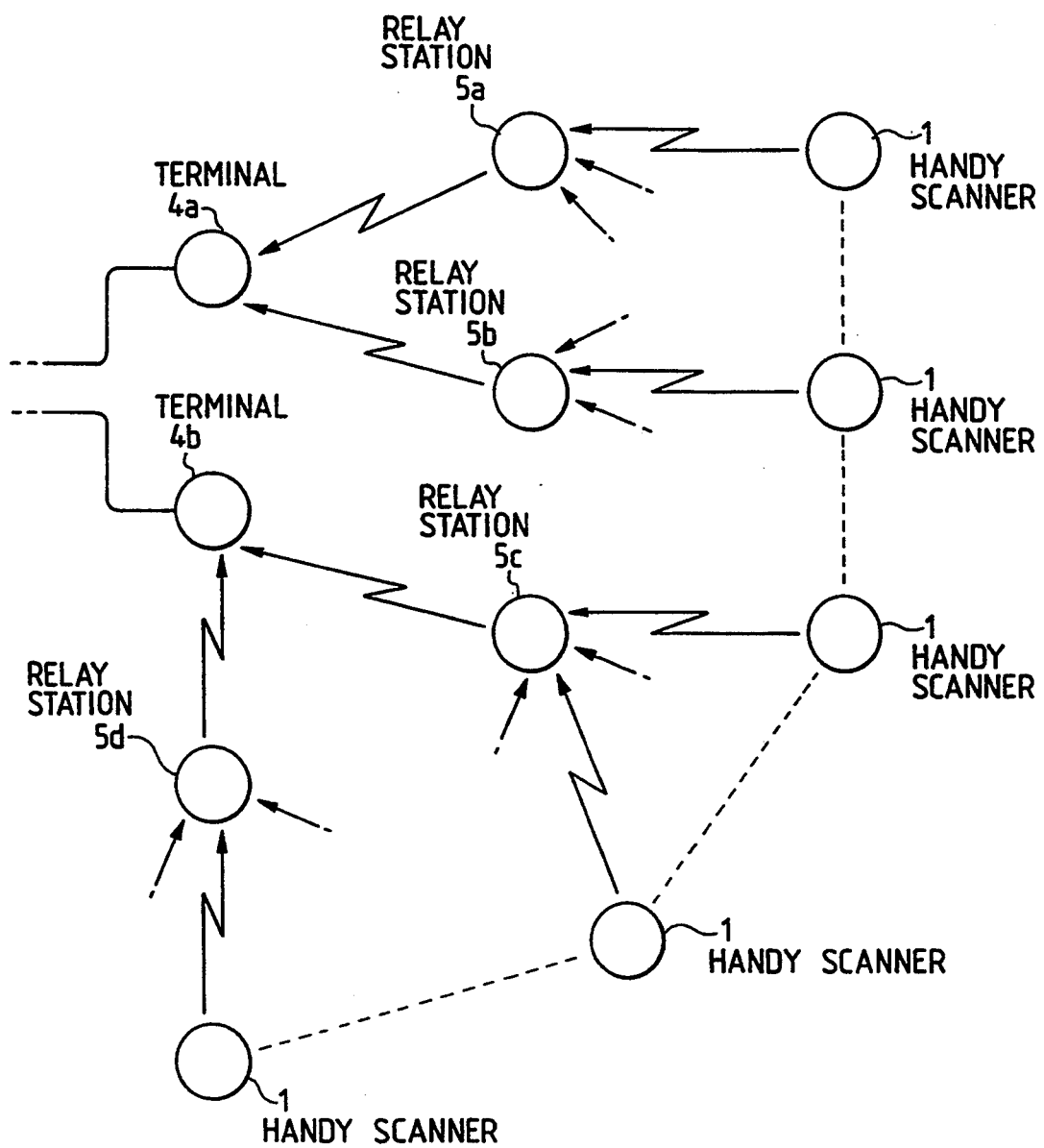
FIG. 4 is a block diagram showing the basic construction of a facsimile machine according to a second embodiment of the present invention.

FIG. 4 is a diagram showing a basic construction of a facsimile machine according to the second embodiment of the present invention. In the second embodiment, a plurality of relay stations 5a to 5d, which are generally designated by reference numeral 5, are installed at such locations as to allow their optical communication with the terminals 4 and each handy-scanner 1.

Each relay station 5 detects image data that is transmitted in the form of a light signal from the handy-scanner 1, and transmits it in the form of a light signal to the terminal 4a or 4b.

Figure 5:
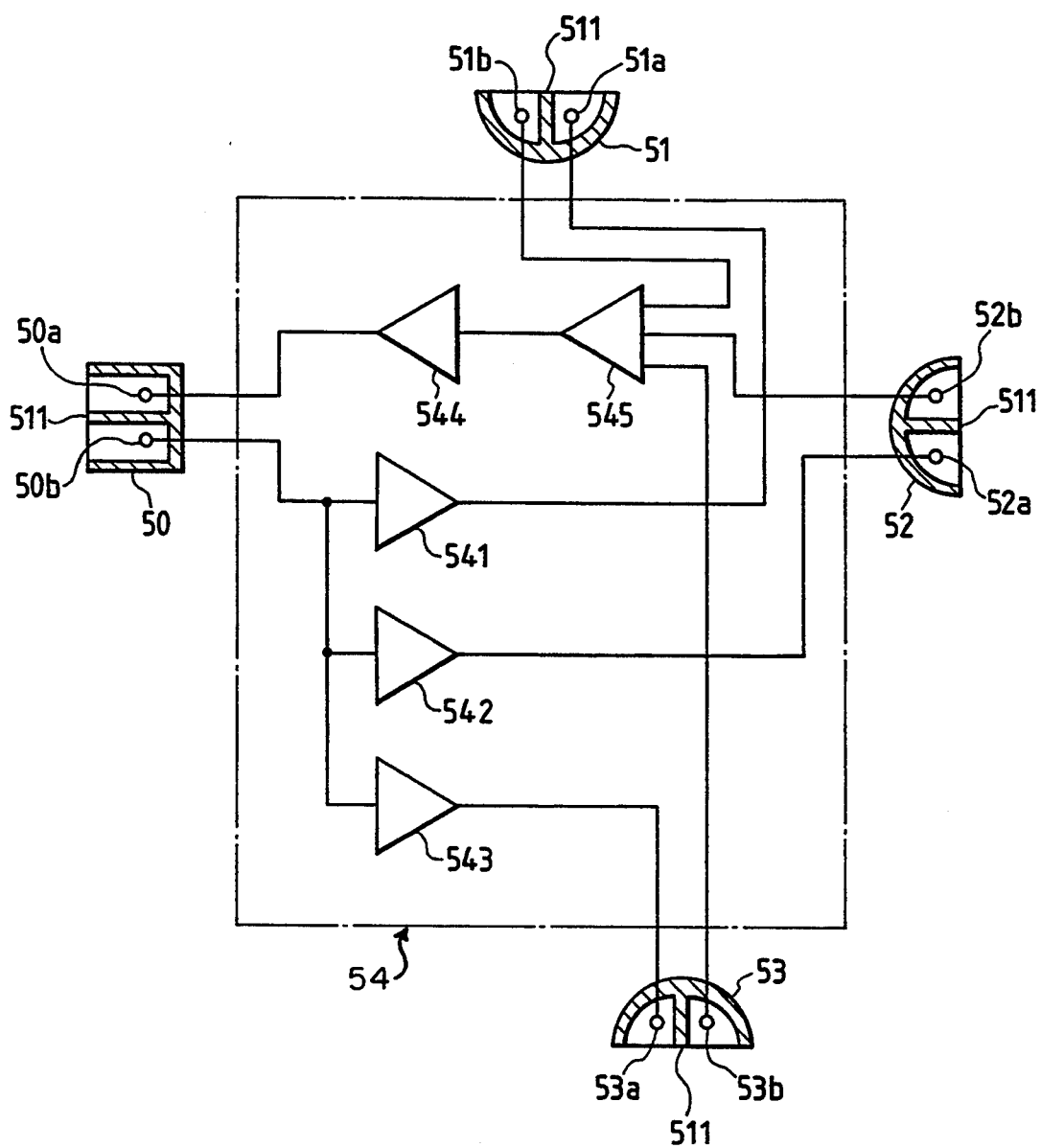
FIG. 5 is a diagram showing in block and schematic forms the basic construction of a relay station.

FIG. 5 is a diagram showing in block and schematic form a basic construction of the relay station 5. The construction of one of the relay stations will be typically described since the relay stations have the same constructions. The same reference numerals or marks as those in the previous embodiment represent the same or like parts.

The relay station 5 includes a repeater 50, a plurality of repeaters 51, 52, and 53 for optical communication with the handy-scanner 1, and a controller 54 for controlling those repeaters.

In the repeater 50, a light emitting element 50a and a light receiving element 50b are provided, and these elements are separated by a light-shield plate 511. The other repeaters 51 to 53 have the same constructions in connection with those corresponding elements 51a to 53a, 51b to 53b, and 511.

A light signal emitted from the handy-scanner 1 is detected by one of the light receiving 51b to 53b of the repeaters 51 to 53. The detected signal is supplied to the light emitting element 50a of the repeater 50, through an adder 545 and an amplifier 544. The light emitting element 50a converts the detected signal into a light signal and transmits the light signal to the terminal 4.

The light signal emitted from the terminal 4 is detected by the light receiving element 50b of the repeater 50. The detected signal is output through the amplifiers 541,542, and 543 respectively to the light emitting elements 51a, 52a, and 53a. These light emitting elements convert the received signals into light signals and send them.

With such an arrangement, the image data read by the handy-scanner 1 is converted into a light signal and transferred through the relay station 5 to the terminal 4. The image data detected by the terminal 4 is transferred through the selecting portion 3 to the host machine 2. In the host machine 2, the image data received is temporarily stored into the image memory 23. Thereafter, it is read out thereof, and transmitted to an intended facsimile terminal.

In the present embodiment, the handy-scanner can be used in a broader area and is more convenient in use.

A third embodiment of the present invention, which will be described hereinafter, is arranged such that each relay station 5 contains image data storing means, the host machine 2 detects the remainder of the memory capacity of the image memory 23 of the host machine per se, and transfers the detect result to the relay station 5. When the host machine 2 is in a memory full state, the relay station 5 temporarily stores image data. When the memory full state of the host machine 2 is removed, the stored data of the relay station 5 is transferred to the host machine 2.

In the second embodiment thus far described, when the remainder of the memory capacity of the image memory 23 that can be still used is insufficient, the host machine rejects reception of the image data from the handy-scanner 1.

Figure 6:
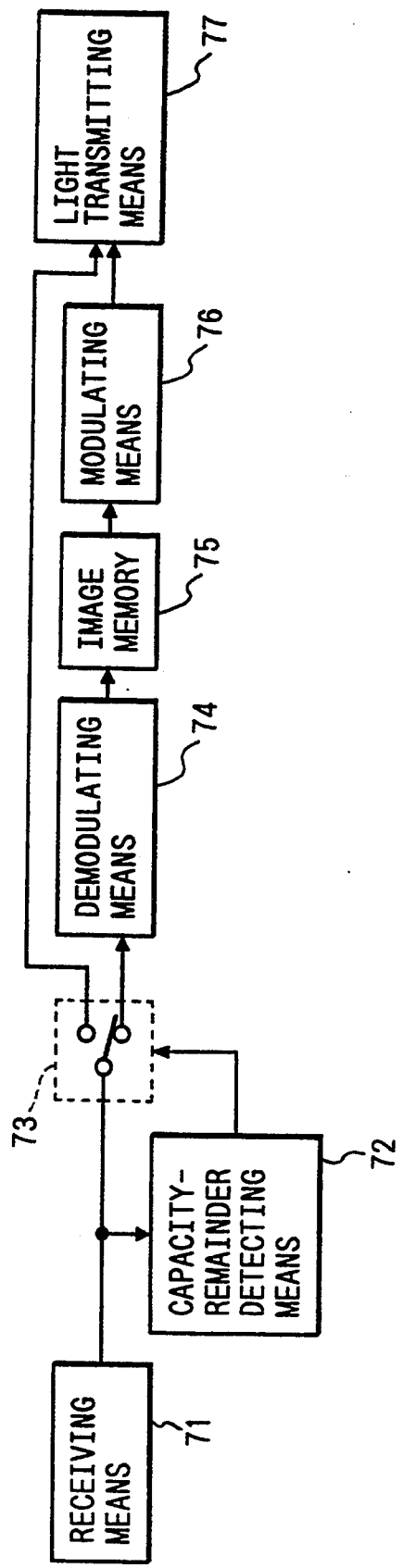
FIG. 6 is a block diagram showing a relay station according to a third embodiment of the present invention.

FIG. 6 is a functional block diagram showing a relay station which is a third embodiment of the present invention.

A receiving means 71 receives a light signal from the handy-scanner 1 or a light signal from the host machine 2 through the terminal 4. A selector 73 selects a destination of the image data received by the receiving means 71. A capacity-remainder detecting means 72 receives a light signal from the host machine 2, and detects the remainder of the memory capacity of the image memory 23 in the host machine 2. According to the detect result, the detecting means 72 controls the selector 73.

A demodulating means 74 demodulates the received image data and stored it into an image memory 75° A modulating means 76 modulates image data from the image memory 75 and output to a light transmitting means 77. The light transmitting means 77 converts the received image data into a light signal and transmits it to the terminal 4.

Figure 7:
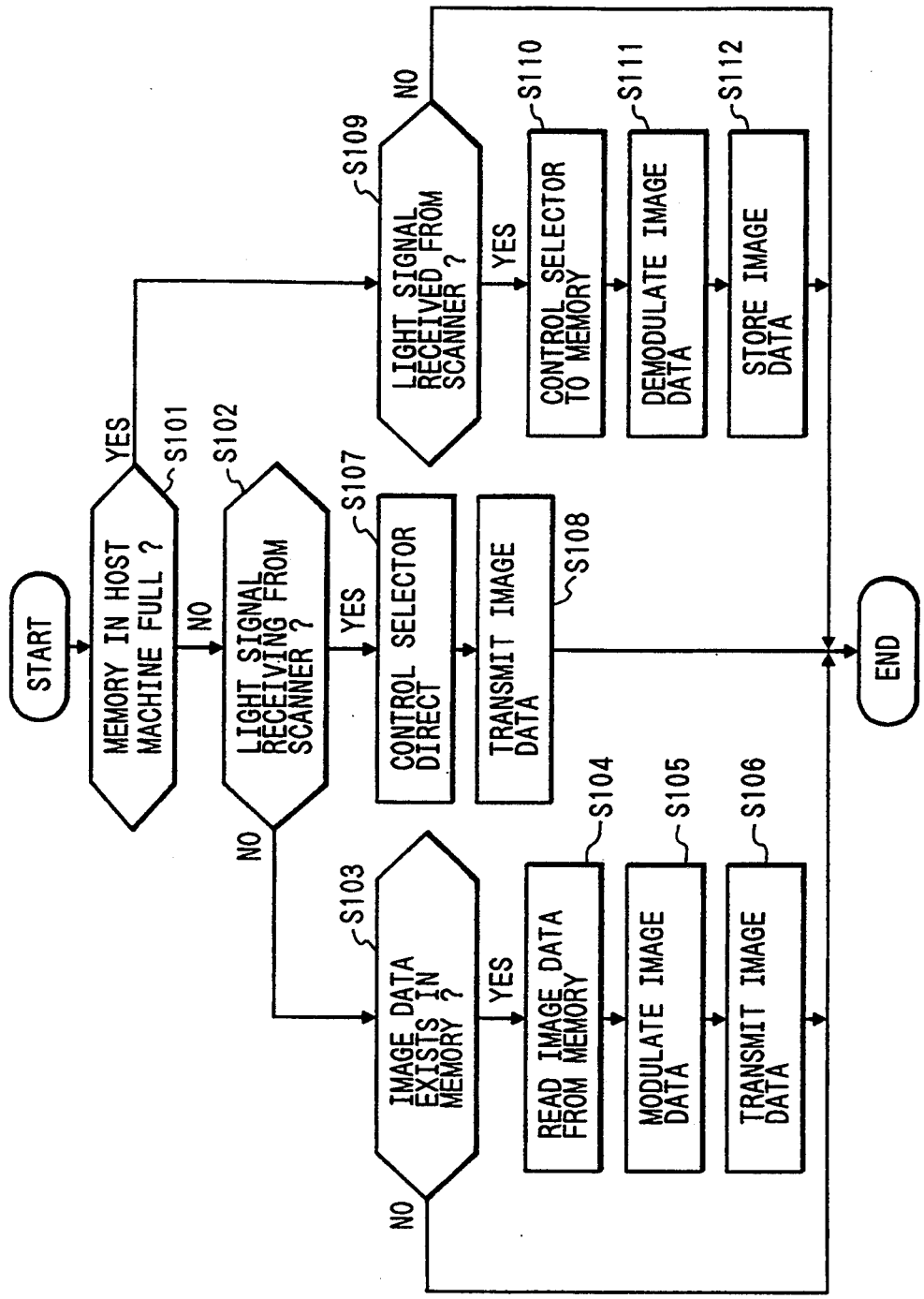
FIG. 7 is a flowchart showing the operation of the relay station of FIG. 6.

FIG. 7 is a flowchart showing the operation of the third embodiment. The execution of the flowcharted job is repeated at predetermined periods.

In step S101, the memory-remainder detecting means 72 detects the current remainder of the memory capacity of the image memory 23 in the host machine 2. If the remaining or free memory capacity of the image memory 23 is sufficient, in step S102 control checks if the light signal from the handy-scanner 1 is received by the receiving means 71.

If it is not received, in step S103 control checks if image data is stored in the image memory 75. If it is stored, in step 104 the image data is read out o#the image memory 75. In step S105 the readout image data is modulated by the modulating means 76. In step S106 the light transmitting means 77 converts it into a light signal and sends the light signal to the terminal 4.

If the light signal is received in step S102, in step S107 the selector 73 is controlled by the detecting means 72 in the host machine, so that the receiving means 71 is directly connected to the light transmitting means 77. In step S108 the image data received by the receiving means 71 is transmitted, as it is, from the light transmitting means 77 to the terminal 4.

If in step S101 the free memory capacity of the image memory 23 in the host machine 2 is reduced below a preset value, that is, the image memory is in a memory-full state, in step S109 control checks if the light signal is received by the receiving means 71. If it is received, in step S110 the selector 73 is controlled by the detecting means 72, so that the receiving means 71 is connected to the demodulating means 74. In step S111 the image data received by the receiving means 71 is demodulated by the demodulating means 74, and in step S112 it is stored into the image memory 75.

Thus, in the third embodiment, when the current free memory capacity of the image memory 23 in the host machine 2 is insufficient, the relay station 5 temporarily stores the image data from the handy-scanner 1 into its image memory. When the free memory capacity is sufficient, the relay station reads the image data out of the image memory and transfers it to the host machine 2. Accordingly, an operator can send image data irrespective of the amount of the free memory capacity of the image memory in the host machine 2.

In the third embodiment thus far described, if the free memory capacity of the image memory 75 in the relay station 5 is insufficient, the relay station 5 rejects reception of the image data from the handy-scanner 1.

In a fourth embodiment to be described hereinafter, each relay station detects the current free memory capacity of the image memory 75 per se of itself, and converts the detect result into a light signal and sends it to another relay station. When the image memory 75 of one relay station is in a memory-full state, the relay station searches another relay station where its image memory 75 is not full, and transfers the received image data to the latter.

Figure 8:
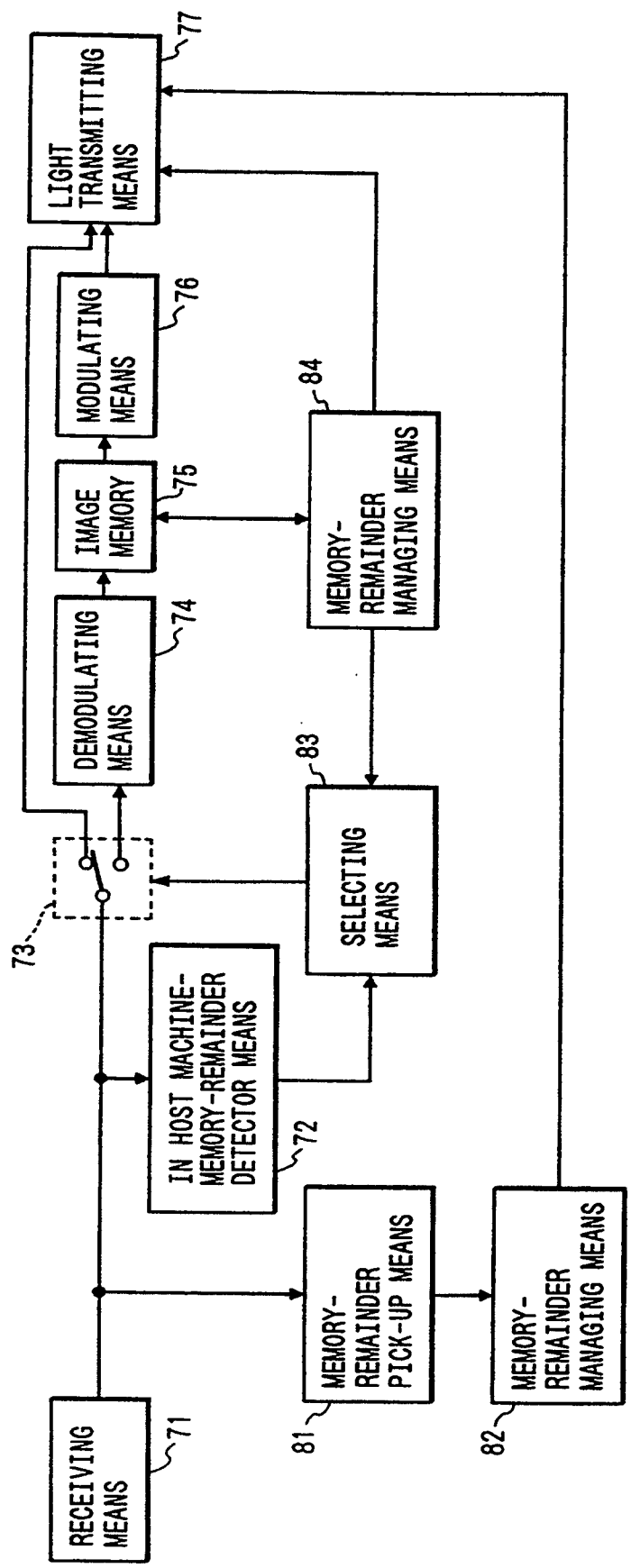
FIG. 8 is a block diagram showing a relay station according to a fourth embodiment of the present invention.

FIG. 8 is a functional block diagram showing a relay station which is a fourth embodiment of the present invention.

A memory-remainder pick-up means 81 picks up a signal indicative of the memory remainder, or the remainder or free memory capacity, of the image memory in the relay station 5. A memory-remainder managing means 82 stores the pick-up result. A memory-remainder detecting means 84 detects the memory remainder of the image memory 75. The memory remainder detected is transferred by a light transmitting means 77 to another relay station. A selecting means 83 controls a selector 73 according to the detect result from the memory-remainder detecting means 84 and the detect result from the memory-remainder detecting means 72 in the host machine.

Figure 9:
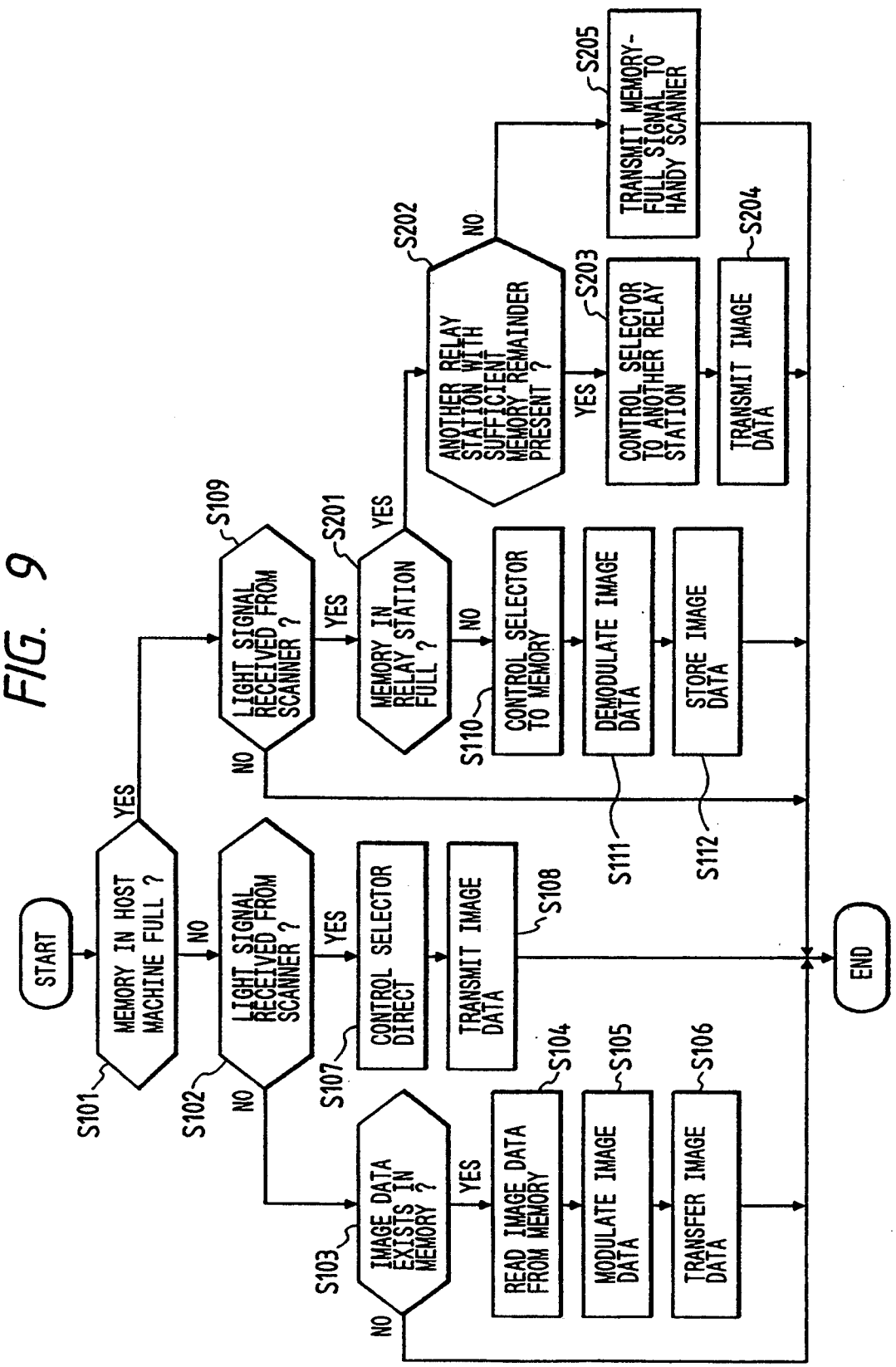
FIG. 9 is a flowchart showing the operation of the relay station of FIG. 8.

FIG. 9 is a flowchart showing the operation of the fourth embodiment. Steps designated by the same reference numerals as those in the previous embodiments execute the same or like procedures. Therefore, their explanation will be emitted.

In step S101 if control determines that the image memory is full in the host machine 2, control goes to step S101. In this step if control determines that a light signal is received, control goes to step S201 where the memory-remainder detecting means 84 detects the remainder of the memory capacity of the image memory 75. If the memory remainder is sufficient, the job of steps S110 to S112 will be executed, so that the received image data is stored into the image memory 75 as in the previous embodiment.

In step S201 if the memory remainder of the image memory 75 is below a preset value and in a memory-full state, control goes to step S202 where control refers to the memory-remainder managing means 82 to search another relay station where its image memory is not full. If such a relay station is found, control goes to step S203.

In step S203 the selector 73 is controlled by the detecting means 72, so that the receiving means 71 is directly connected to the light transmitting means 77. In step S204 the image data received by the receiving means 71 is transferred from the light transmitting means 77 to the relay station of which the image memory is not full.

In step S202 if the relay station of which the image memory is not full is not found, in step S205 a signal indicating that the image memory is in a memory-full state is transferred to the handy-scanner 1.

In the fourth embodiment as described above, when the memory remainder of the image memory 75 in the relay station is insufficient, the image data from the handy-scanner 1 is transferred to another relay station of which the image memory is not in a memory-full state. Accordingly, even when a relay station receiving image data directly from the handy-scanner 1 is in a memory-full state, an operator can send image data irrespective of the memory remainder of the image memory in the relay station.

In the fourth embodiment, when the image memory 75 of the relay station becomes full while it receives the image data from the handy-scanner 1, it cannot receive further image data.

In a fifth embodiment of the present invention that will be described hereinafter, when the image memory 75 of the relay station becomes full during the reception of image data, the image data that is received thereafter is transferred to another relay station, and consecutively is stored in the image memory of the latter.

When the subsequent image data is transferred to another relay station, identification data, together with image data, is transferred to the relay station. The identification data indicates that the image data filling in the image data of the relay station is continuous to the subsequent image data to be stored in the image memory of the destined relay station. In this relay station, the identifying data and the image data are both stored in the image memory.

Figure 10:
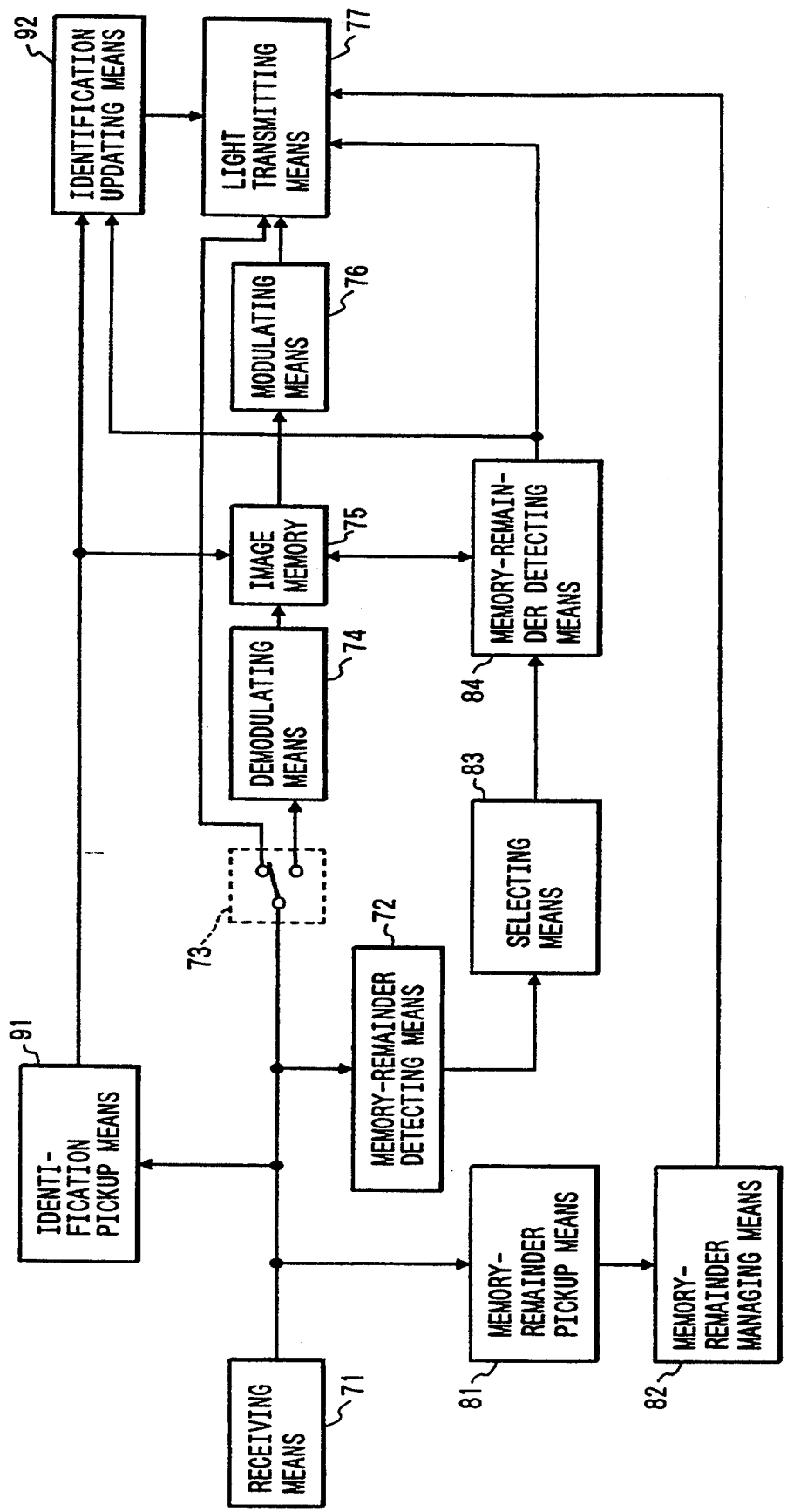
FIG. 10 is a block diagram showing a relay station according to a fifth embodiment of the present invention.

FIG. 10 is a functional block diagram showing the hardware arrangement of the fifth embodiment of the invention.

An ID (identification) pickup means 91 picks up the ID data that is transferred, together with image data, from another relay station. When the memory-remainder detecting means 84 detects a memory-full state of the image memory 75, an ID updating means 92 updates the ID data and outputs it.

Figure 11:
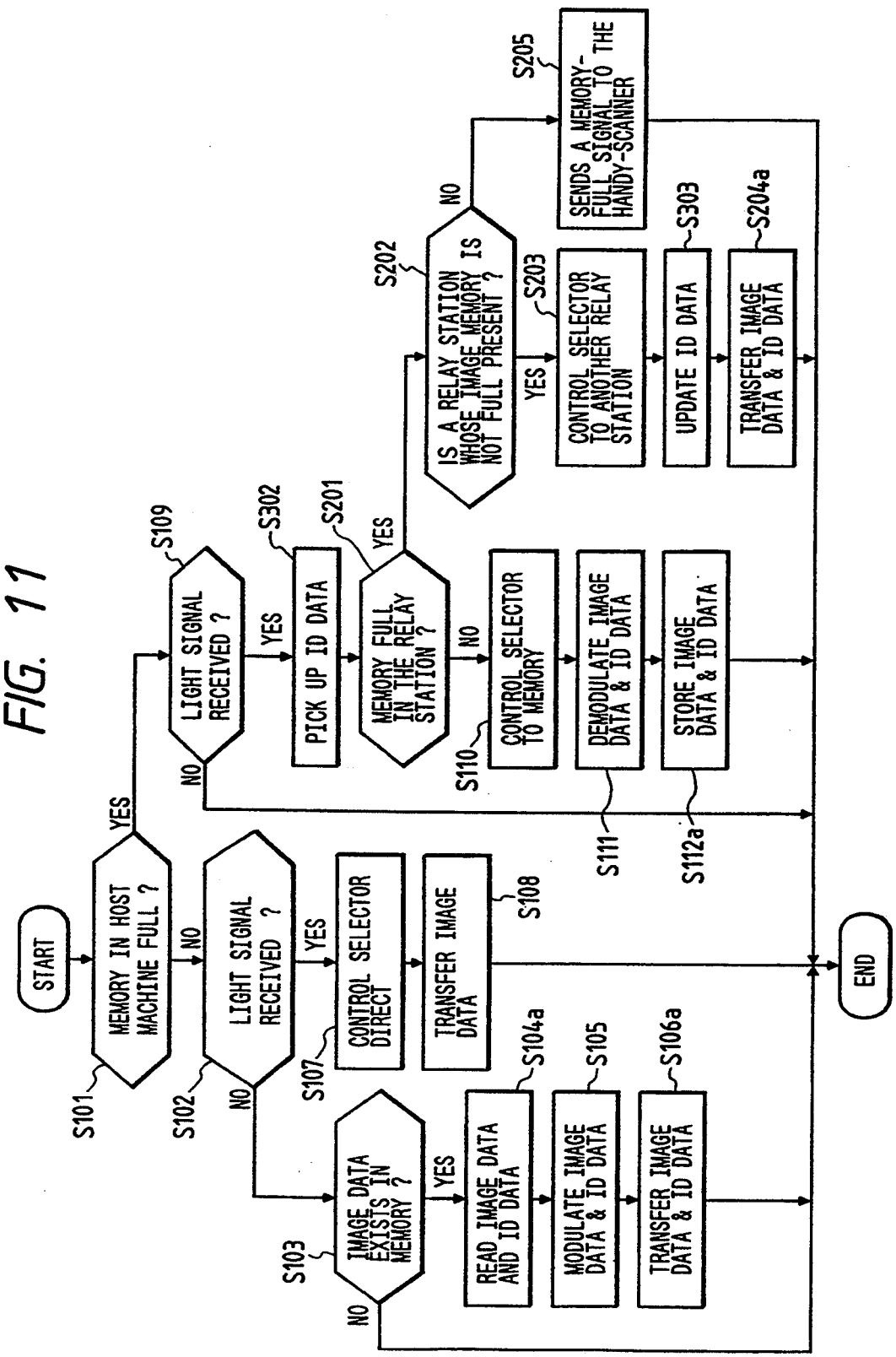
FIG. 11 is a flowchart showing the operation of the relay station of FIG. 10.

FIG. 11 is a flowchart showing the operation of the relay station as the fifth embodiment of the present invention.

If step S101 determines that the image memory 23 of the host machine 2 is in a memory-full state and step S109 determines that a light signal is received, in step S302 ID data, if it is attached to the image data from another relay station, is picked up by the ID pickup means 91, and output to the image memory 75 and the ID updating means 92. When the image data is transmitted from the handy-scanner 1 and not attendant with ID data, the ID data is not picked up.

The ID data will be described here in brief.

The ID data consists of a communication number and a structure number. The communication number is used for all the data simultaneously read by the handy-scanner 1. The structure number is assigned to each image data of those items of image data simultaneously read.

If step S201 determines that a light signal is not detected and step S103 determines that image data is stored in the image memory 75 of the relay station per se, in step S104a image data and ID data (communication number [1] and structure number [1]) are read out of the image memory. Thereafter, in step S106a the image data and the ID data are converted into light signals and transmitted from the light transmitting means 77 to the terminal 4.

The host machine 2 receives image data and ID data from a plurality of relay stations, and rearranges the image data according to the ID data and transmits the image data to an intended facsimile terminal.

It is assumed now that the host machine receives image data (first image data) accompanied by ID data of the communication number [1] and structure number [1] from the relay station now discussed and image data (second image data) accompanied by ID data of the communication number [1] and structure number [2] from another relay station. In this case, the host machine 2 composes the first and second image data in a manner that the second image data follows the first image data, whereby forming original image data.

Thus, in the fifth embodiment, if the image memory of a relay station becomes full when it is receiving image data from the handy-scanner 1, the relay station transfers the subsequent image data to another relay station, and this relay station consecutively stores the subsequent image data in the image memory.

(1) In the present embodiment, a plurality of the terminals, distantly located, intervene in the transmission of image data from the handy-scanner to the host machine. Accordingly, if a plurality of terminals are provided distantly, even in such a circumstance where many obstacles are present, the reliable transmission of image data is secured.

(2) A relay station, which is provided between the terminal and the handy-scanner, relays image data from the handy-scanner to the host machine. A service area of the handy-scanner is enlarged.

(3) A relay station is provided with an image memory. When the image memory in the host machine is in a memory-full state, a relay station temporarily stores image data in its image memory. When the memory-full state in the host machine is removed, the image data is read out of the image memory in the relay station and is transferred to the host machine. Accordingly, the host machine can accept the image data from the handy-scanner even if the host machine is in a memory-full state.

(4) When the memory remainder of the image memory 75 in the relay station is insufficient, the image data from the handy-scanner 1 is transferred to a relay station of which the image memory is not in a memory-full state. Accordingly, even when a relay station receiving image data directly from the handy-scanner 1 is in a memory-full state, reception of the image data is accepted irrespective of the memory remainder of the image memory in the relay station.

(5) When the image memory of a relay station becomes full when it is receiving image data from the handy-scanner, it transfers the subsequent image data to another relay station. The new relay station consecutively stores image data in its image memory. Accordingly, the relay station can accept the subsequent image data from the handy-scanner even if the image memory of the relay station becomes full.

Next, other embodiments using various operation modes will be described with reference to FIGS. 12 through 26.

Figure 12:
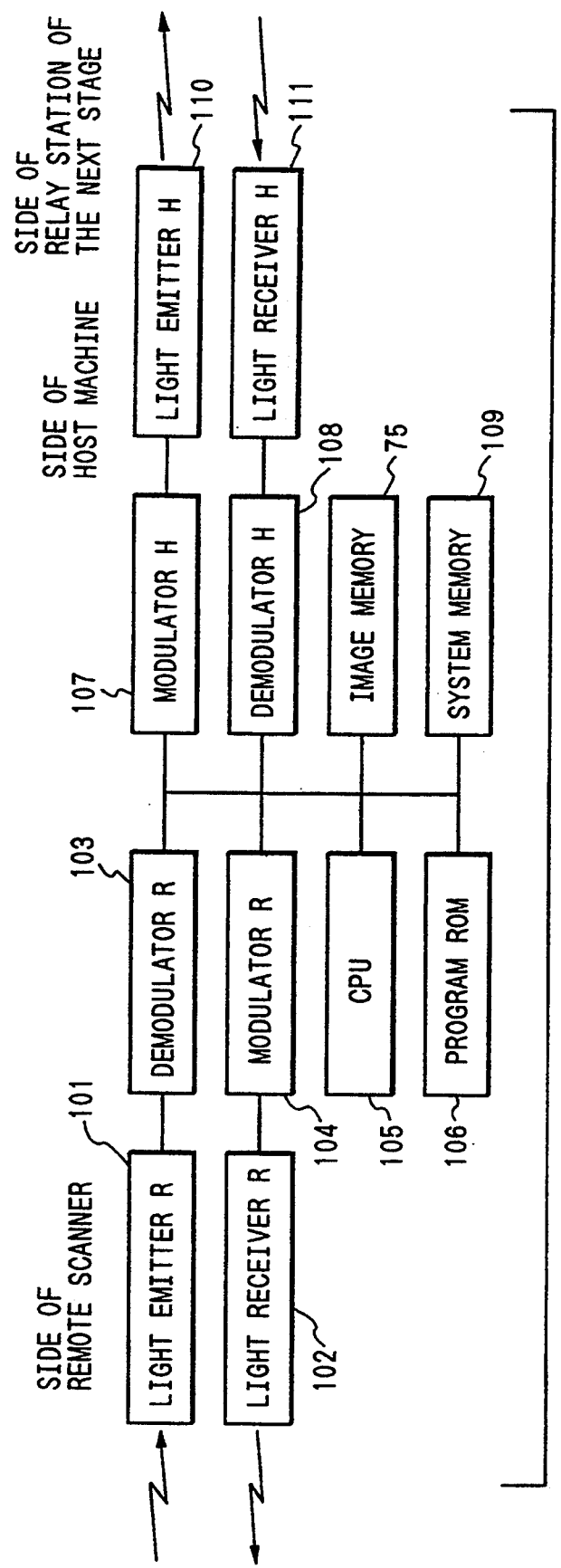
FIGS. 12 is a block diagram showing a hardware construction of a relay station.
Figure 22:
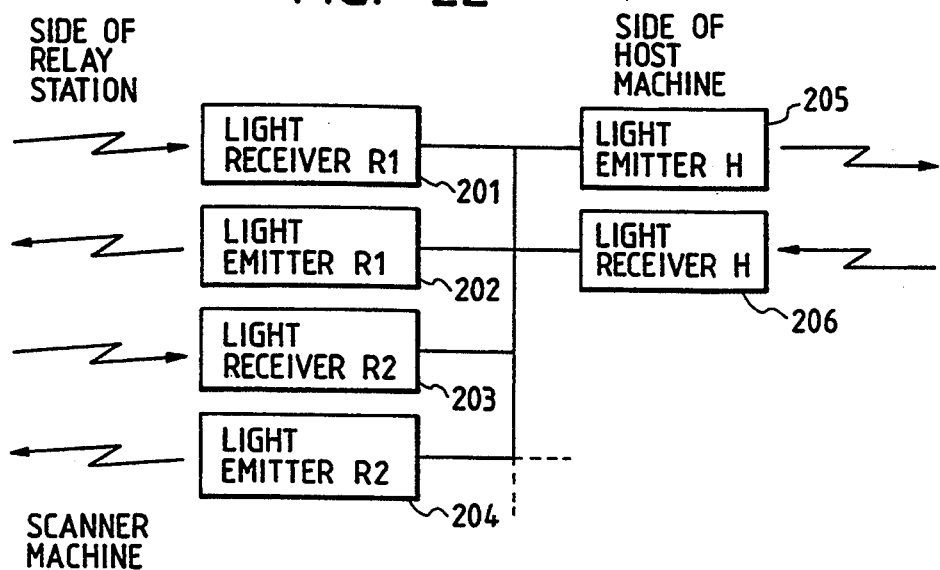
FIG. 22 is a block diagram showing the construction of the relay station in a reverse mode.
Figure 23:
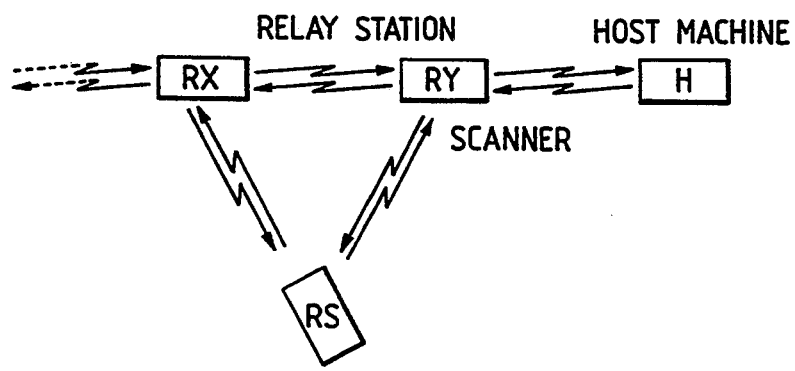
FIGS. 23 to 25 are explanatory diagrams showing an image data transmission flow between the host machine, the relay stations and the handy scanner.

FIG. 12 shows a block diagram showing the hardware construction of a relay station 5 when image data is transferred from the remote or handy scanner 1 or the prestage relay station 5 to the host machine 2 or the next-stage relay station 5. R and H in the light emitters and light receives indicate the directions of the transfer of image data. In this instance (through mode or memory mode), the image data is transferred from the left to the right. In a reverse mode, the relay station is arranged as shown in FIG. 22, and image data is transferred from the right to the left. The relay station 5 shown in FIG. 23 includes a light receiver(R1) 201 and a light transmitter(R1) 202 at the side of a relay station 5, and a light receiver (R2) 203 and a light transmitter(R2) 204 at the side of a handy scanner 1. The relay station 5 also includes a light transmitter(H) 205 and a light receiver(H) 206 at the side of a host machine 2.

As shown in FIG. 11, the relay station 5 includes a light receiver(R) 101 which receives a light signal emitted from a handy scanner 1, a light transmitter(R) 102 which transmits a light signal to the scanner 1, a demodulator(R) 103 which demodulates the light signal received by the receiver 101, a modulator(R) 104 which modulates data to be transmitted in the form of a light signal, a CPU 105, and a program ROM 106. The relay station 5 also includes a modulator(H) 107 which modulates data to be transmitted in the form of a light signal, a demodulator(H) 108 which demodulates a light signal received by a light receiver 111, an image memory 75 which stores image therein, a system memory 109 for previously storing a system program, a light transmitter 110 which transmits, to a host machine 2 or another relay station 5 in a next stage, data modulated in the form of a light signal by the modulator 107, and a light receiver(H) 111 which receives a light signal from the host machine 2 or another relay station 5 in the next stage.

1) Through Mode

Figure 13:
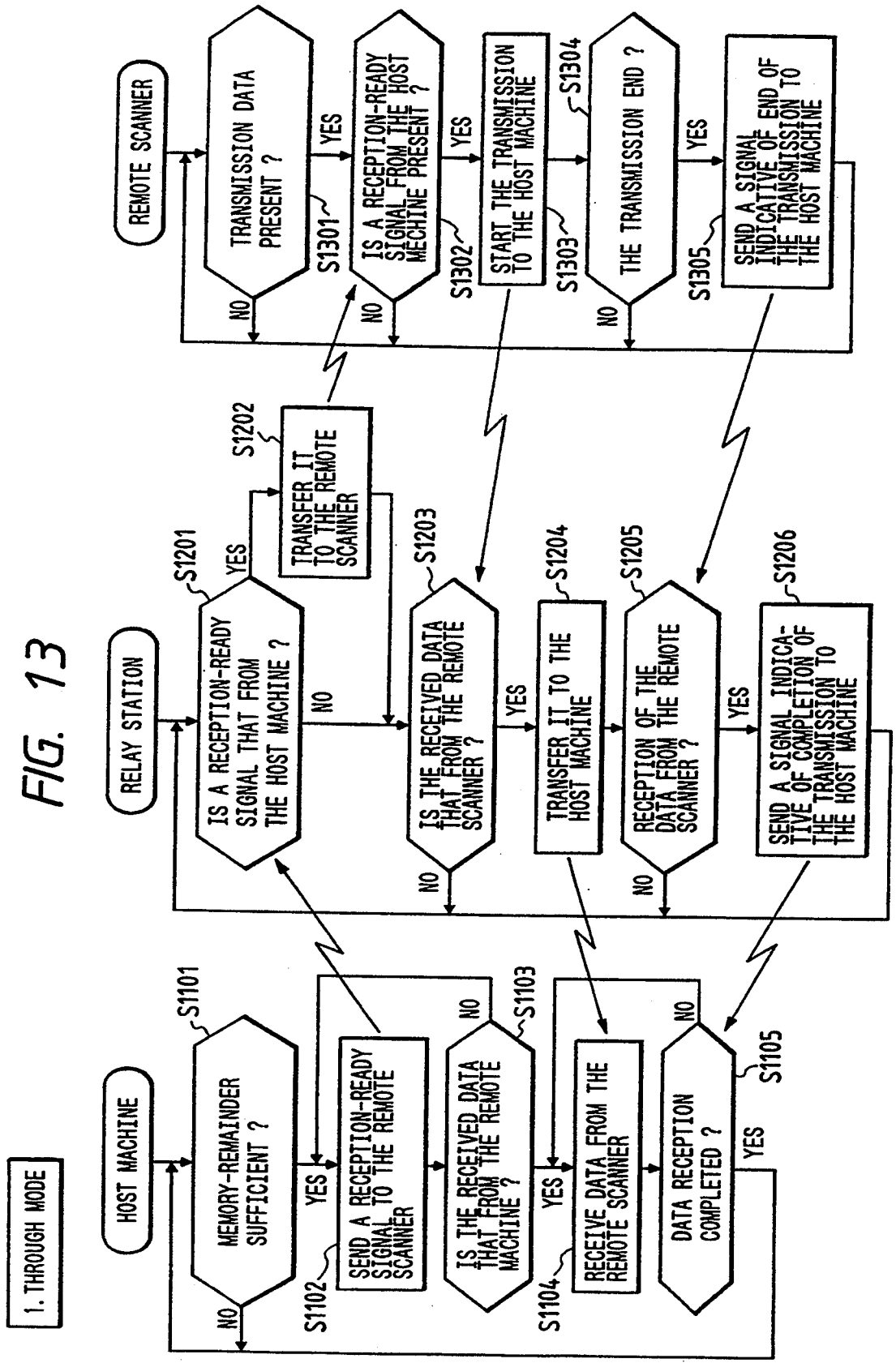
FIGS. 13 to 15 and 17 are flow charts showing the operation of the host machine, the relay station and the handy scanner according to other embodiments of the present invention, respectively.

FIG. 13 is a flowchart showing the operations of the handy scanner 1, the relay station 5, and host machine 2 when image data is transferred from the remote scanner 1 to the host machine 2. The operations are substantially the same as those for the data transfer as described in the above-described embodiments, except for data transmission by a Through Mode.

When there is a sufficient memory-remainder of the image memory 23 in the host machine 2 so that the host machine 2 is ready for receiving an image data signal, a through mode is set up. In this mode, the image data signal from the handy scanner is demodulated by the relay station 5 and straightforwardly transferred to the host machine. The image data, after divided into a plurality of blocks, is transferred by a flow control means, such as X.25 protocol.

The operations of the host machine 2 will be explained in step S1101 it is judged whether a memory-remainder in the image memory 23 is sufficient or not. If it is sufficient, a reception-ready signal is transmitted from the host machine 2 to the handy scanner 1 in step S1102. On the other hand, if it is insufficient, the operation in step S1101 is repeated. In step S1103, it is judged whether data received by the host machine 2 is data transmitted from the handy scanner 1, or not. If yes, the host machine 2 receives data from the handy scanner 1 in step S1104, whereas if not, the operation goes back to step S1102. In step S1105, it is judged whether data reception in the host machine 2 is completed or not. If yes, the operation goes back to step S1101. On the other hand, if not, the operation goes back to step S1104.

Then, the operations of the relay station 5 will be described. If it is judged in step S1201 that a signal received by the relay station 5 is the reception-ready signal from the host machine 2, then the relay station 5 transmits the reception-ready signal to the handy scanner 1 in step S1202. If it is not the reception-ready signal, it is judged in step S1203 whether the signal is that sent from the handy scanner 1, or not. If yes, the relay station 5 send the signal from the handy scanner 1 to the host machine 2 in step S1204 whereas, if no, the operation goes back to step S1201. In step S1205, it is judged whether the signal-reception from the handy scanner 1 is completed, or not. If yes, the relay station 5 send a signal indicative of completion of the transmission to the host machine 2 in step S1206. If no, the operation goes back to step S1201.

The operations of the handy scanner 1 will be described. In step S1301, it is judged whether transmission data exists in the handy scanner, or not. If no, the operation in step S1301 is repeated. If yes, it is judged in step S1302 whether the reception-ready signal from the host machine exists, or not in step S1302, whereas if no, the operation back to step S1301. In step S1303, the transmission to the host machine 2 is started if there exists the reception-ready signal in the handy scanner 1. In step S1304, it is judged whether the transmission to the host machine 2 is completed, or not. If it finished, in step S1305 the handy scanner 1 sends a signal indicative of completion of the transmission to the host machine.

2) Memory Mode

Figure 14:
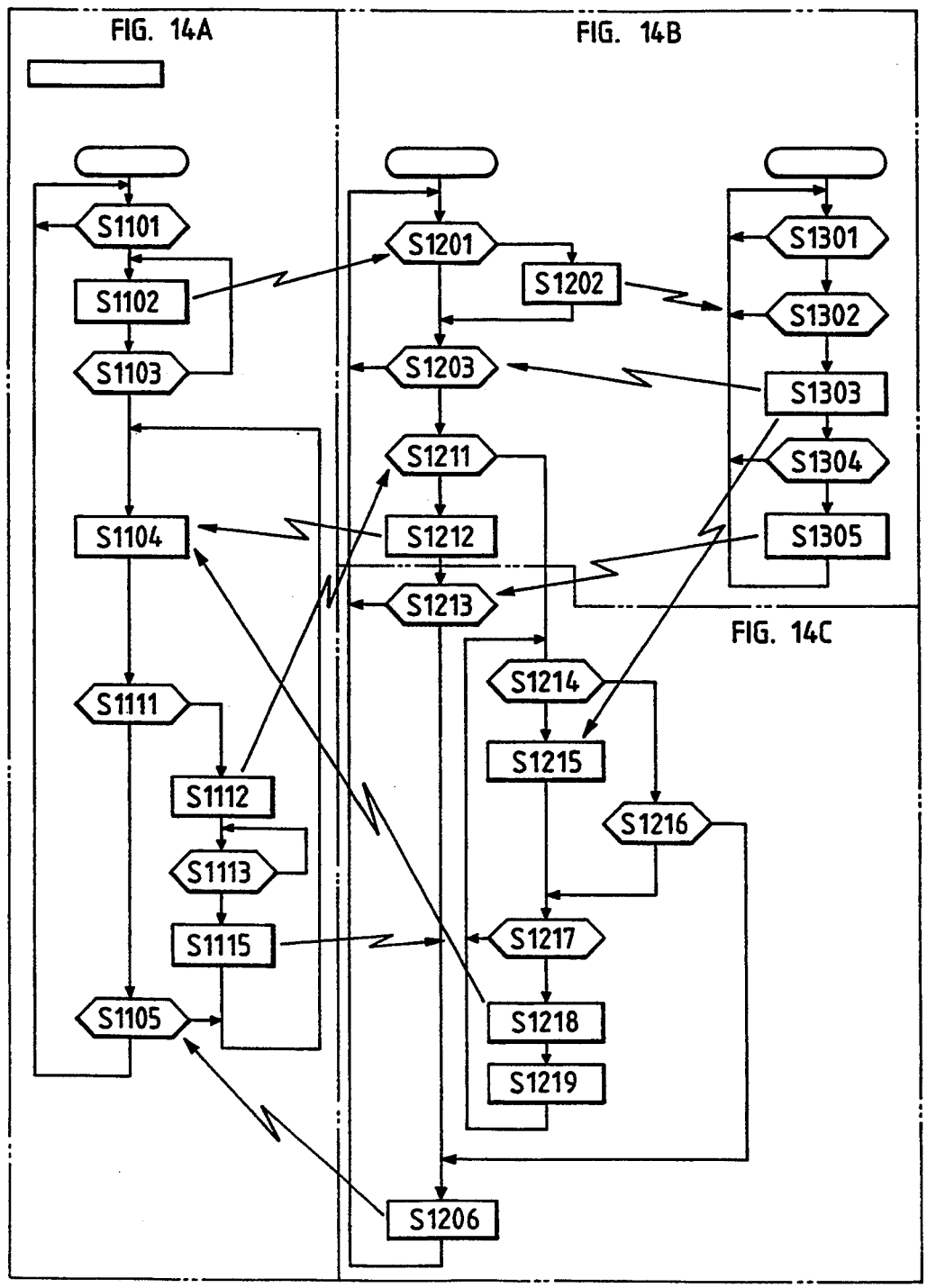
Figure 14A:
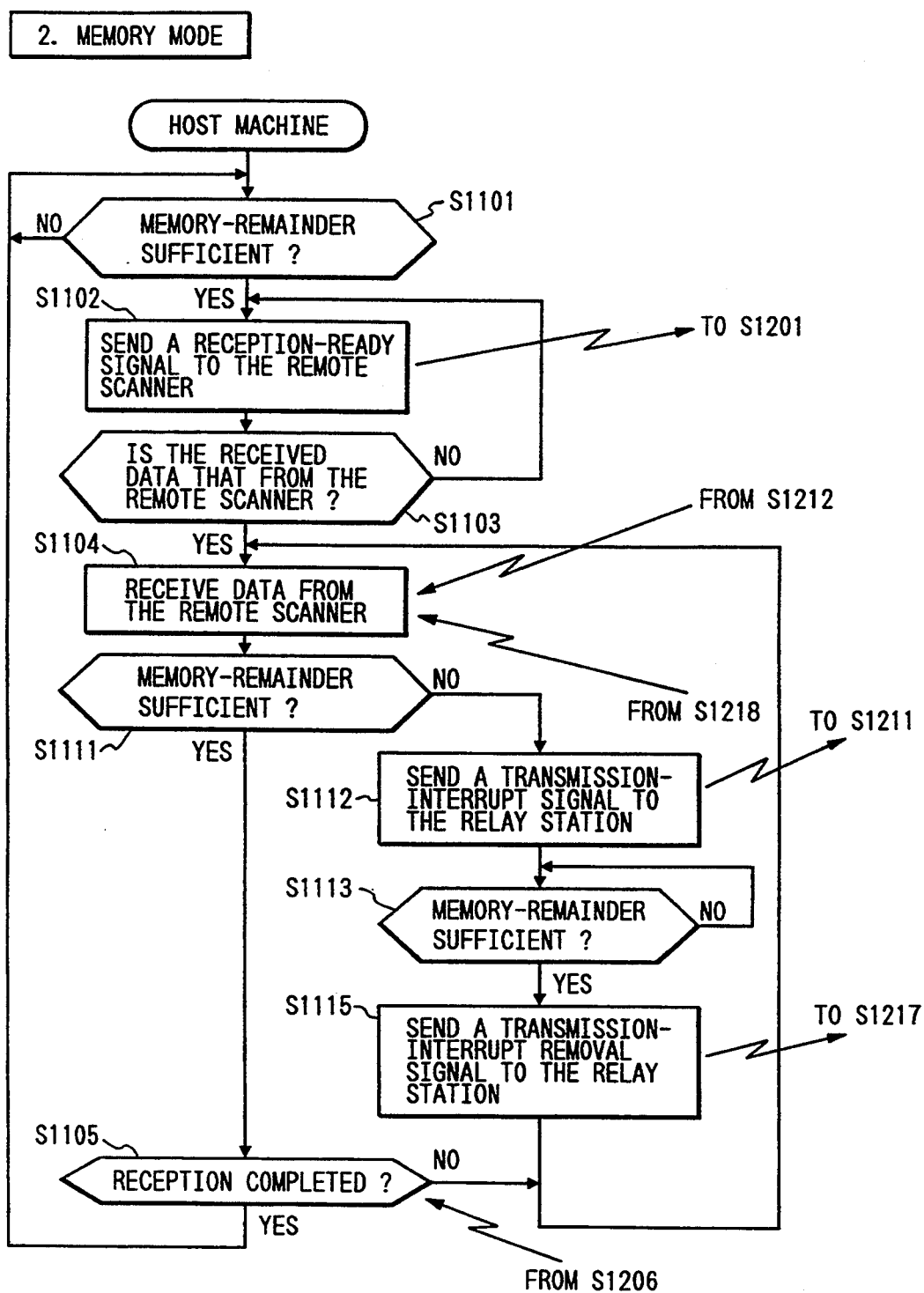
Figure 14B:
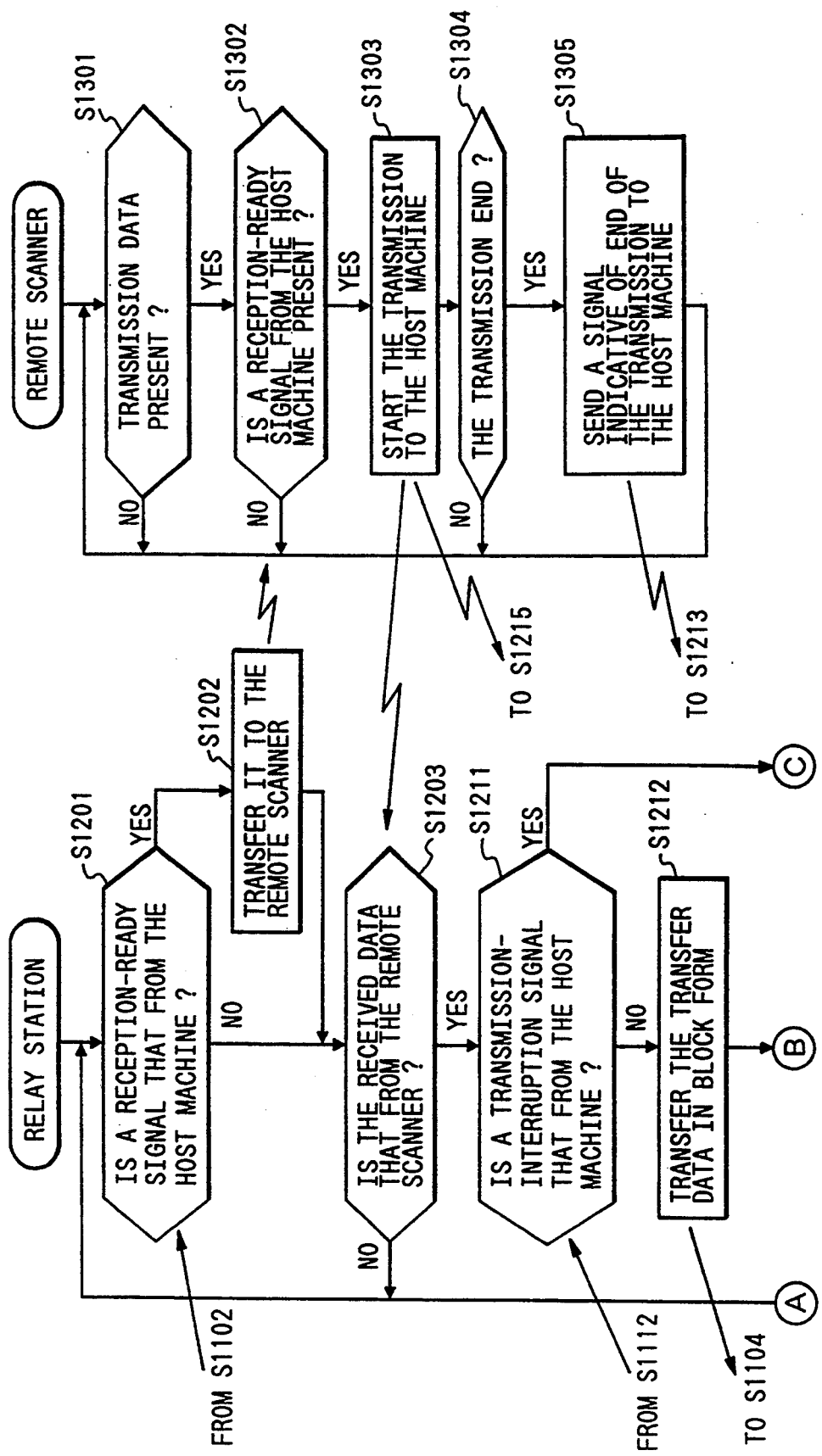
Figure 14C:
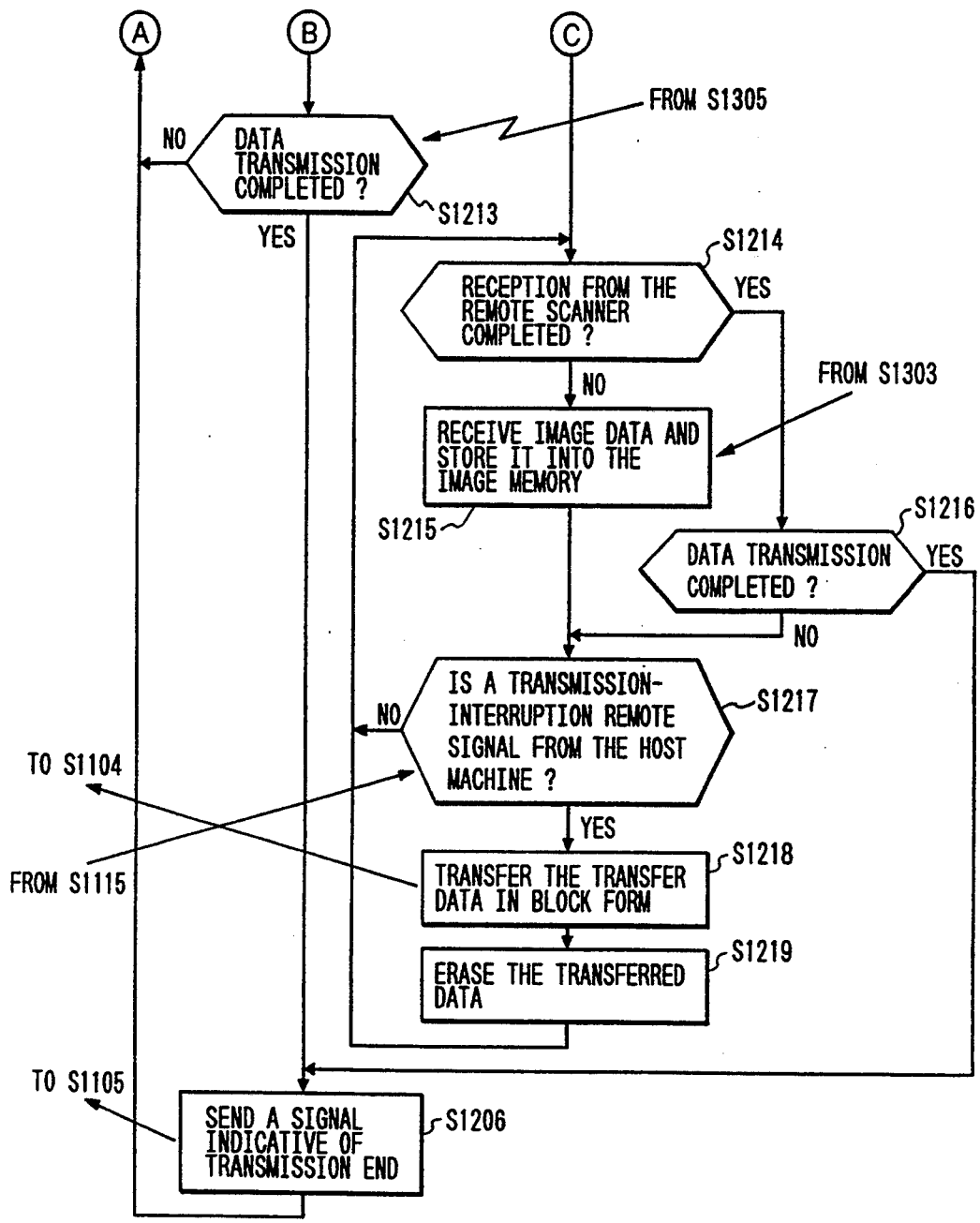

FIG. 14 is a flowchart showing the operation of the facsimile machine in which data transmitted from the handy scanner 1 is loaded into the image memory 75 in the relay station 5 when the host machine is busy. This is one embodiment of a memory mode. The operation of the handy scanner 1 is the same as that in the through mode. The operation of the host machine is slightly different, but is applicable for the through mode, too.

The operation of the memory mode will be described with reference to FIGS. 14 and 12.

When it is judged that the host machine 2 is in a memory-full state so that it cannot receive image data in step S1111, the host machine 2 sends a transmission-interruption signal to a relay station 5 in step S1112 so that the relay station 5 suspends the transmission of image data to the host machine 2 In step S1113, it is judged whether a memory-remainder is sufficient or not. If sufficient, the host machine 2 sends a transmission-interruption removal signal to the relay station 5 in step S1114. On the other hand, the relay station 5 receives, through the receiver 111, the transmission-interruption signal from the host machine 2. The received signal is demodulated by a demodulator 108, and serves as a transmission-interruption request signal. When it is judged that the relay station 5 receives a transmission-interrupt request signal from the host machine 2 in step S1211, the relay station 5 interrupts the current transmission of the image data blocks, and is placed to a memory mode. Subsequently, if it is judged that the data-reception from the handy scanner 1 is not yet completed in step S1214, the relay station 5 continues to receive the image data from the handy scanner 1, and stores the received image data into the image memory 75 in step S1215. In this case, it operates in two ways. In the first way, the image data received in a through mode is stored into the image memory 75 in a buffer mode. The image data that has been transferred to the host machine 2 are successively erased. The image data blocks starting from a block whose transmission has been interrupted are stored in the image memory 75. In the second way, the host machine 2 requests the handy scanner 1 to send the interrupted image data block back again, and stores the returned image data first.

In the memory mode, when the relay station 1 receives an transmission-interruption removal signal from the host machine 2 in step S1217, the interrupted image data in block form is transmitted to the host machine 2 in step S1218. In this case, the data transmitting operation is performed in asynchronism with the data receiving operation. The data that have been transmitted are successively erased in step S1219.

3) Memory-full in Relay Station Mode

The control flow of FIG. 14 provides no process that is performed when the image memory 75 of the relay station is in a memory-full state on the assumption that the image data from the scanner is transferred or stored into the image memory 75.

Figure 15:
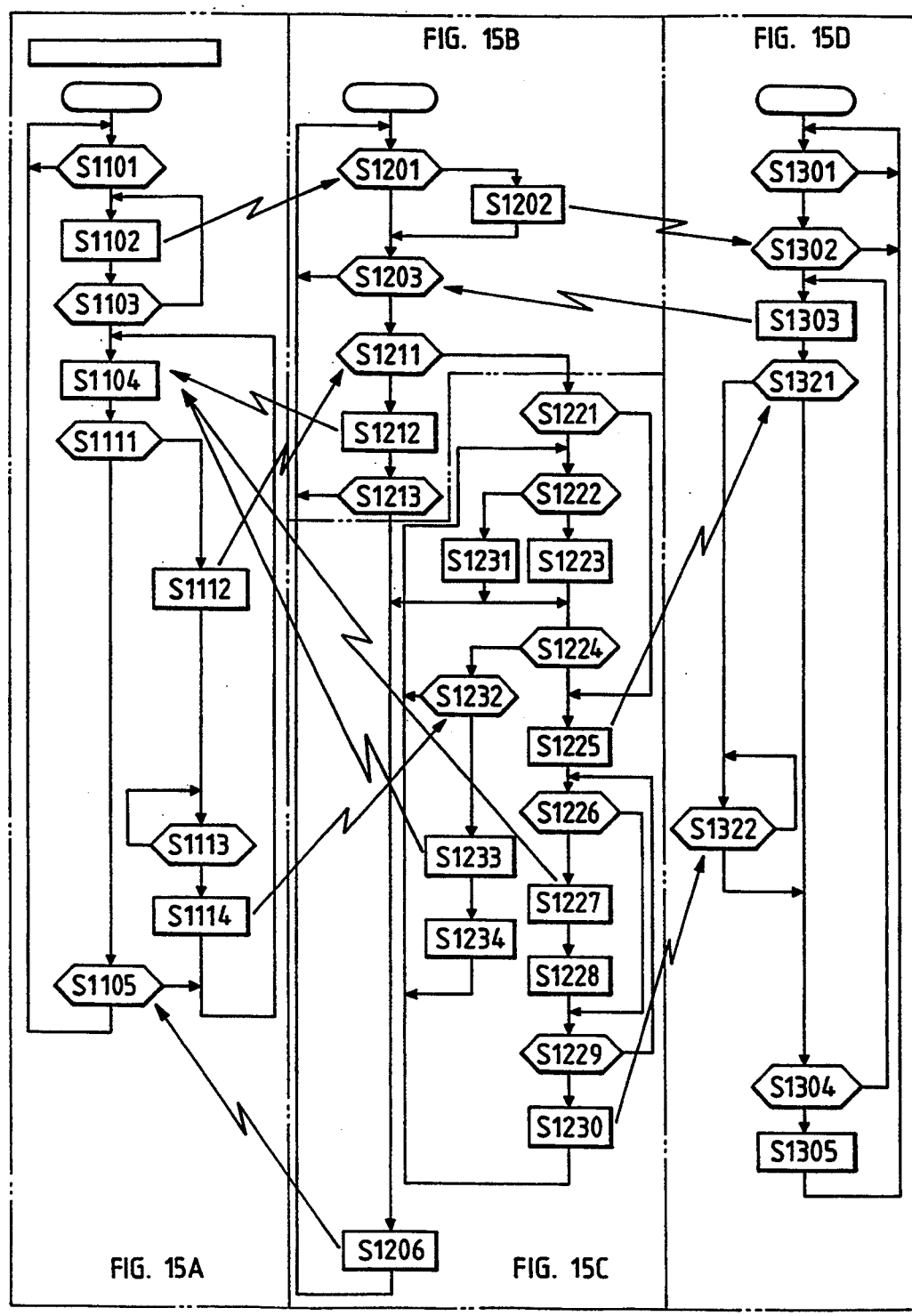
Figure 15A:
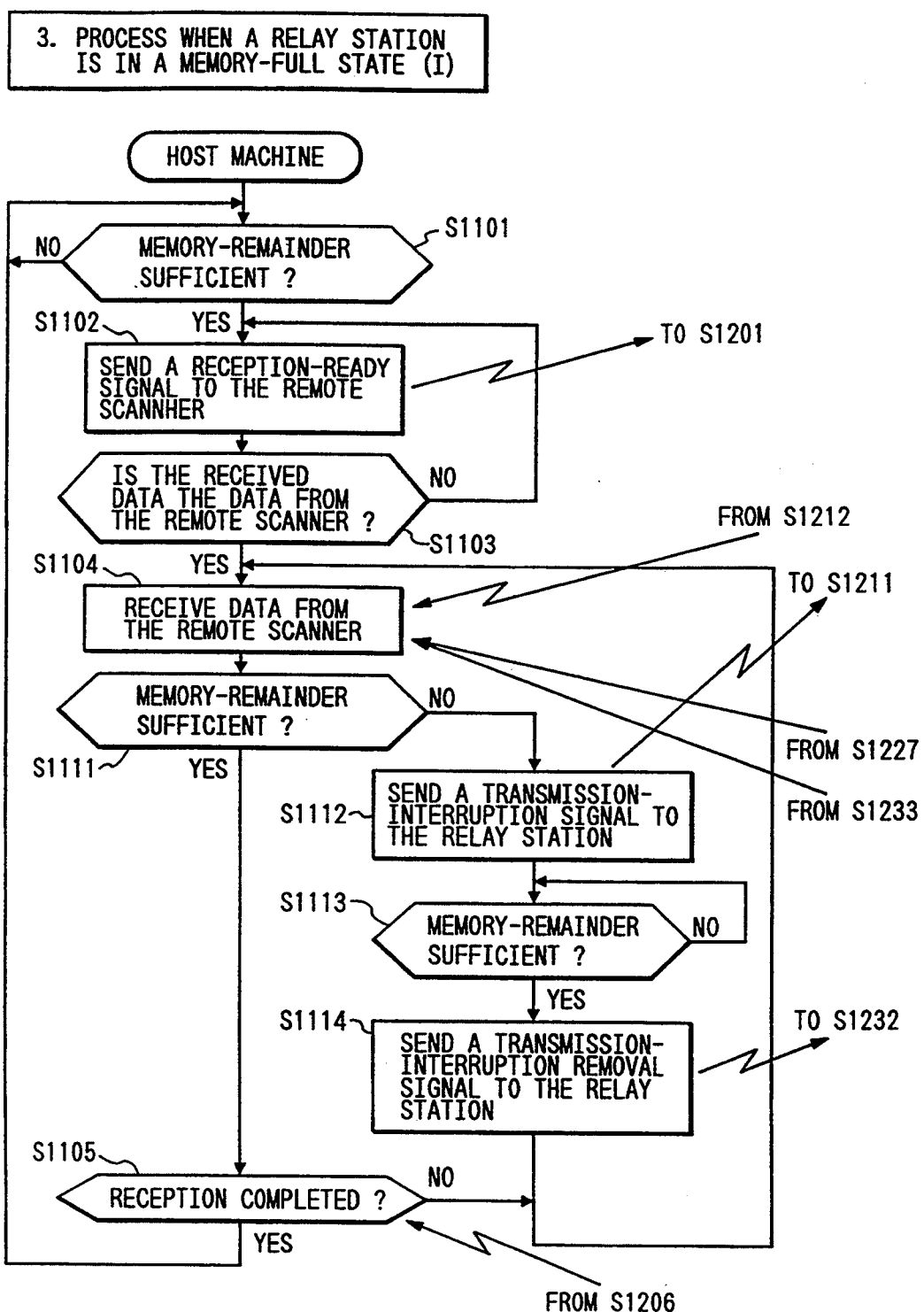
Figure 15C:
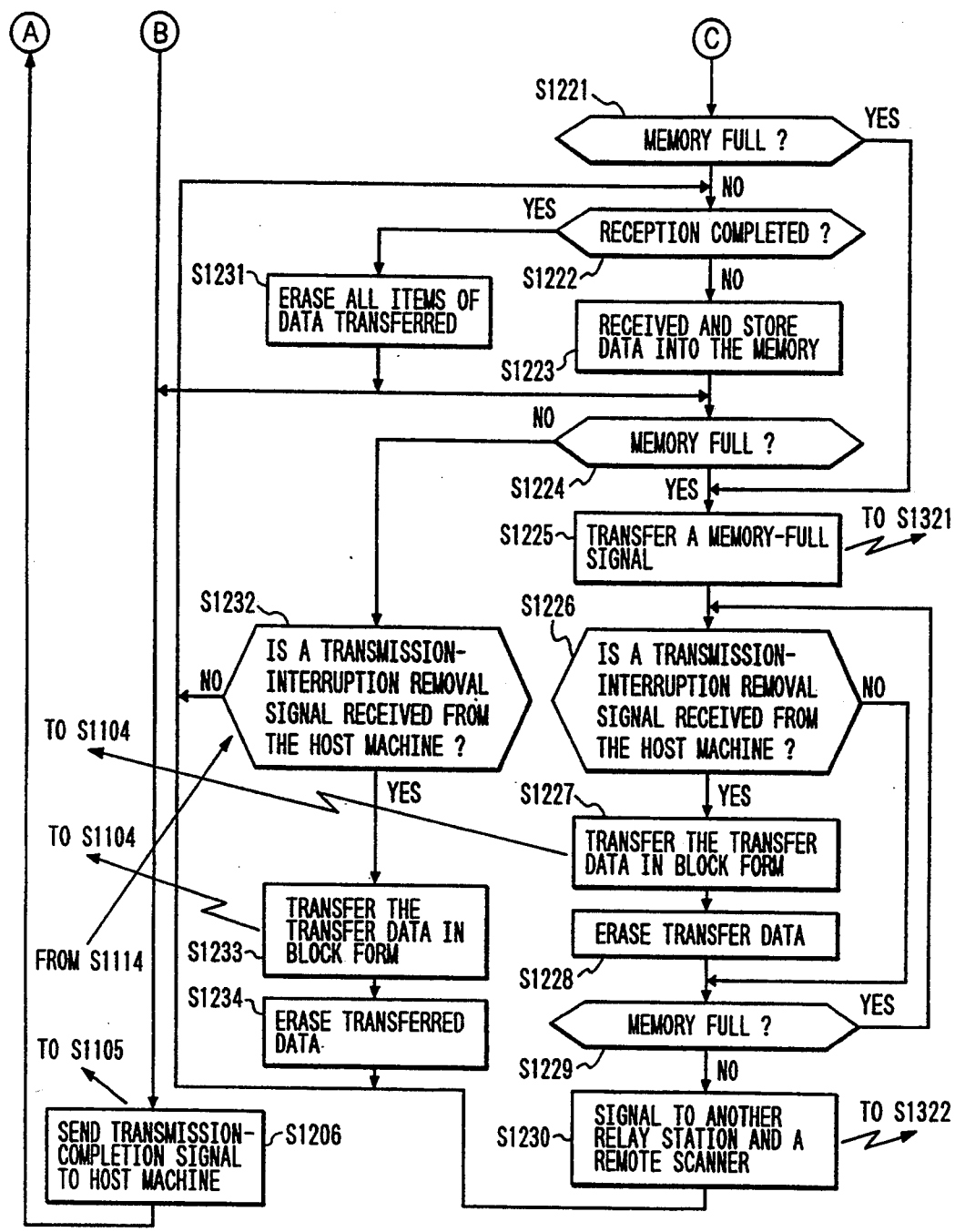

On the other hand, FIG. 15 shows a control flow which contains a process that is performed when the image memory 75 of the relay station 5 is in a memory-full state. When a relay station 5 detects a memory-full state indicating that the image memory 75 in the relay station 5 is full, it sends a memory-full signal to a prestage relay station so that the prestage relay station can be placed to a memory mode. The process of FIG. 15 involves the process of FIG. 14, and the through-mode shown in FIG. 13 can also be performed by using the process of FIG. 15.

A relay station 5 constantly monitors the memory-remainder of the image memory 75. When the relay station 5 is in a memory-full state, it sends a transmission-interrupt request signal to another station 5 or a handy scanner 1 in the same manner as that from the host machine 2. With the request signal, another station 5 or the handy scanner 1 stops its current transmission of image data. When the prestage is a relay station 5 (another relay station), it is placed to a memory mode in order to interrupt the data transmission. On the hand, when the prestage is of the remote scanner 1, the transfer of the image data already stored is interrupted. In this operation, as in the memory mode of the relay station 5, the data blocks being transmitted are not erased, while the data blocks after transferred are erased. When an interrupt removal signal is received from the relay station 5, the data blocks requested are first transferred.

The process of the full-memory mode in the relay station 5 will be described with reference to FIG. 15.

Starting from the explanation of the process in the relay station 5, in S1221, it is judged whether the memory in the image memory 75 of the relay station 5 is full, or not, in step S1221. If it is not full, then in step S1222 it is judged whether the reception of the image data from the handy scanner 1 (or another relay station 5 in a prestage) is completed, or not. If not completed, the relay station 5 receives the image data from the handy scanner 1 and stores it in the image memory 75. Subsequently, in step S1224, it is judged whether the memory in the image memory 75 is full, or not. If it is full, the relay station 5 sends a memory-full signal to the handy scanner 1 in step S1225. In step S1226, it is judged whether a transmission-interruption removal signal is received, or not. If received, then the image data stored in the image memory 75 is transmitted in block form to the host machine 2 in step S1227, and then erased in step S1228. Again, in step S1229, it is judged whether the memory in the image memory 75 is full, or not. If it is not full, then the relay station 5 transmits a transmission-interruption removal signal to another relay station in the prestage or the handy scanner 1. On the contrary, if it is full in step S1229, then process goes to step S1226. When it is judged that the memory in the image memory 75 is full, the process goes to step S1225. If it is judged that the data reception is completed in step S1222, all the transmitted data are erased in step S1231. If it is judged that the memory in the image memory 75 is not full in step S1224, it is judged whether the transmission-interruption removal signal is received, or not, in step S1232. If received, the data in the image memory 75 is transmitted in block form to the host machine 2 in step S1233, and the transmitted data is erased from the image memory 75.

In the Handy scanner 1, it is judged whether the transmission-interruption signal is received from the relay station 5, or not, in step S1321. If it is received, it is judged whether the transmission-interruption removal signal is received from the relay station 5, or not, in step S1322. On the other hand, if it is not received in step S1321, the process goes to step S1304.

4) Data Transfer by a Plurality of Relay Stations

The remote scanner 5 is arranged to have a plurality of light emitters and light receivers. If so arranged, a relay station at the intermediate stage of those multistage relay stations can directly pick up a signal from the remote scanner 1. In this case, several relay stations 5 may operate simultaneously. However, since in the normal through mode, every data is the same, it is made passed through the relay station 5 as many as possible, and the signal from the relay stations 5 is selected. If so done, the relay station 5 that is first placed to a memory mode in the memory-full state is that near to the host machine 2, and then the relay stations 5 are placed to the memory mode successively from the downstream. Accordingly, the data corresponding to the memory capacity of the memory of the relay station 5 through which data is passed can be stored.

Figure 16:
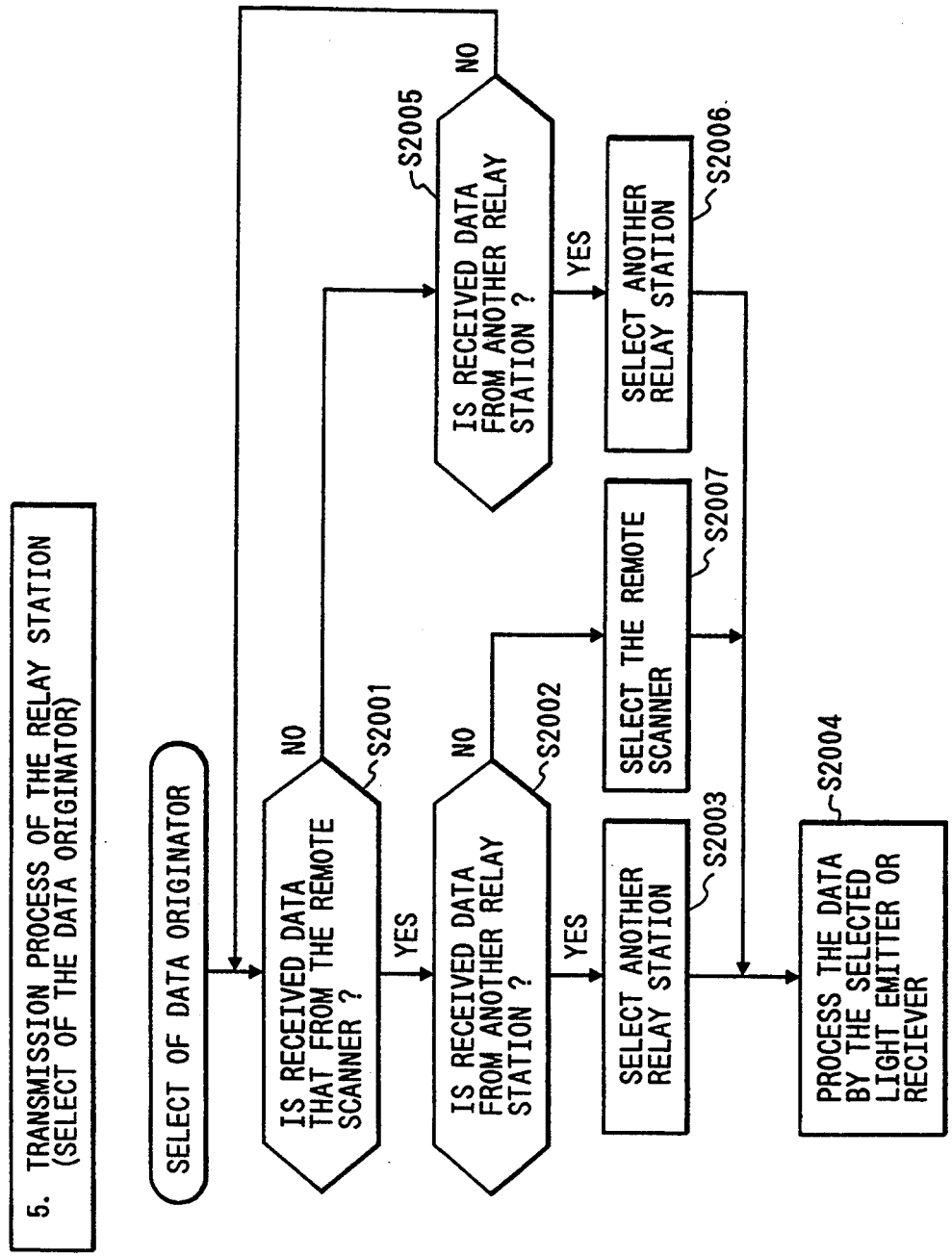
FIG. 16 is a flowchart showing selection of data originator by the relay station.

FIG. 16 is a flow chart showing the process to select one of the light receiver R1 or the light emitter R2 of the relay station 5 in FIG. 22. The result of selection is continuously valid till the image data transfer is completed. In a data transfer diagram shown in FIG. 23, a relay station RY receives a signal from a relay station RS directly or by way of a relay station RX, in order to transmit the signal to a host machine H.

In FIG. 16, it is judged whether the signal received by a relay station 5 is transmitted from a handy scanner 1, or not, in step S2001. If yes, in step S2002 it is judged whether the signal is transmitted from another relay station, or not. If yes, another relay station 5 is selected in step S2003, and data is processed by the selected light emitter or receiver in step S2004. When it is judged that the signal is not transmitted from the handy scanner 5 in step S2001, then it is judged whether the signal is transmitted from another relay station 5, or not, in step S2005. If yes, another relay station is selected in step S2006. Also, when it is judged that the signal is transmitted from anther relay station 5, the handy scanner 1 is selected in step S2007.

5) Scanner Select

The signals from a plurality of scanners 5 can be controlled by attaching terminal identification data, which is assigned to every scanner, to image data. When the image data having the identification data different from the identification data attached to the image data being currently transferred is received from a prestage relay station 5 or the scanner 1, the relay station 5 is regarded as a relay station being busy and rejects the reception of data from the scanner 1 or the prestage relay station 4, and continues the present processing till the processing of the data being transferred is completed. When the data transfer is completed and the host machine 2 or the next stage relay station 5 is ready for transmitting the next image data, a busy-removal signal is transmitted so that image data is transmitted from the prestage relay station 5 or the handy scanner 1.

Figure 17B:
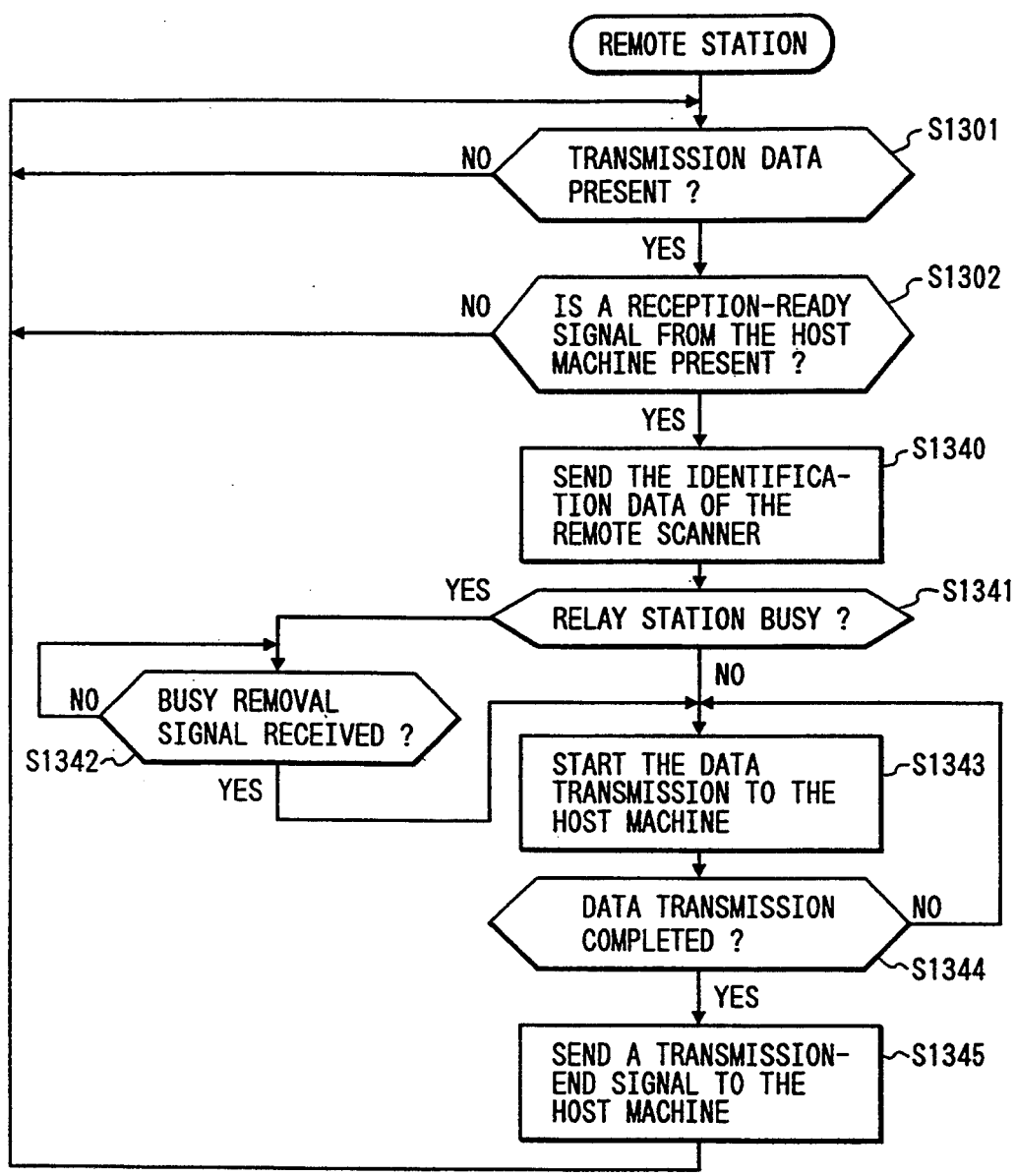
Figures 18, 18A:
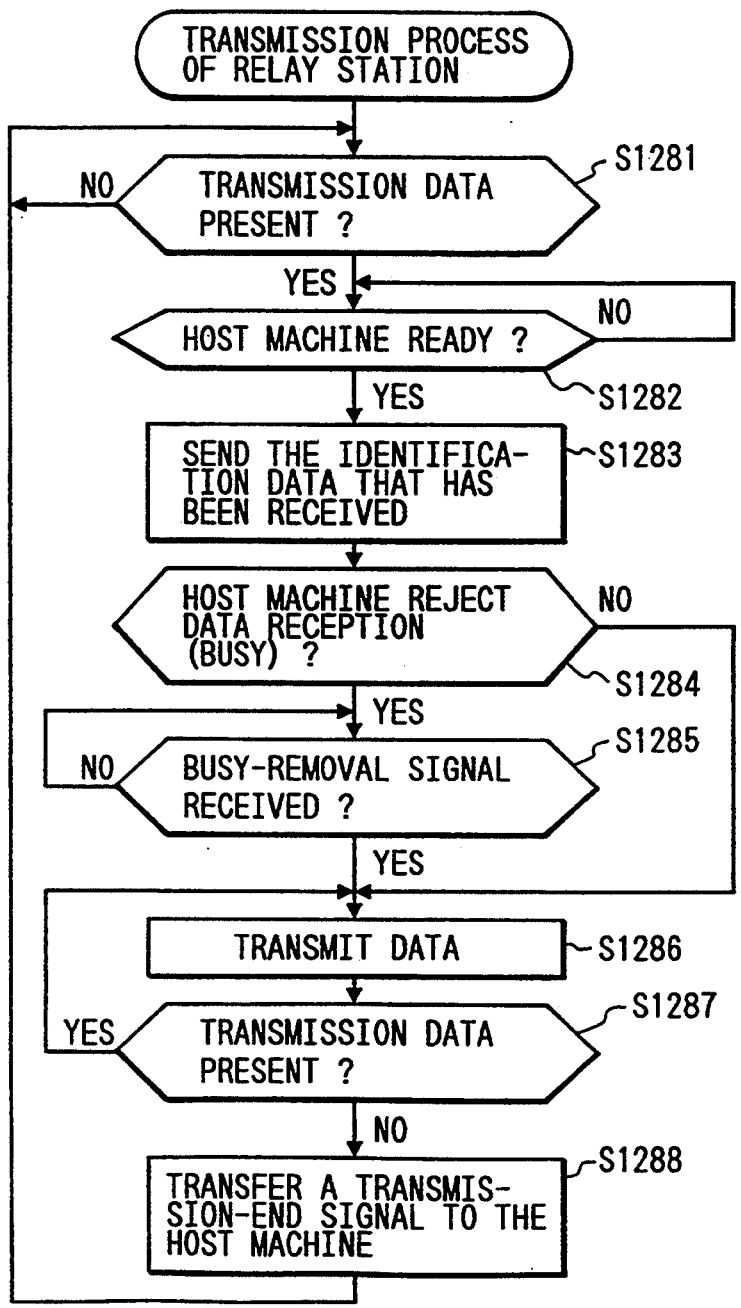
FIG. 18 is a flowchart showing a transmission/reception process of the relay station.
Figure 18B:
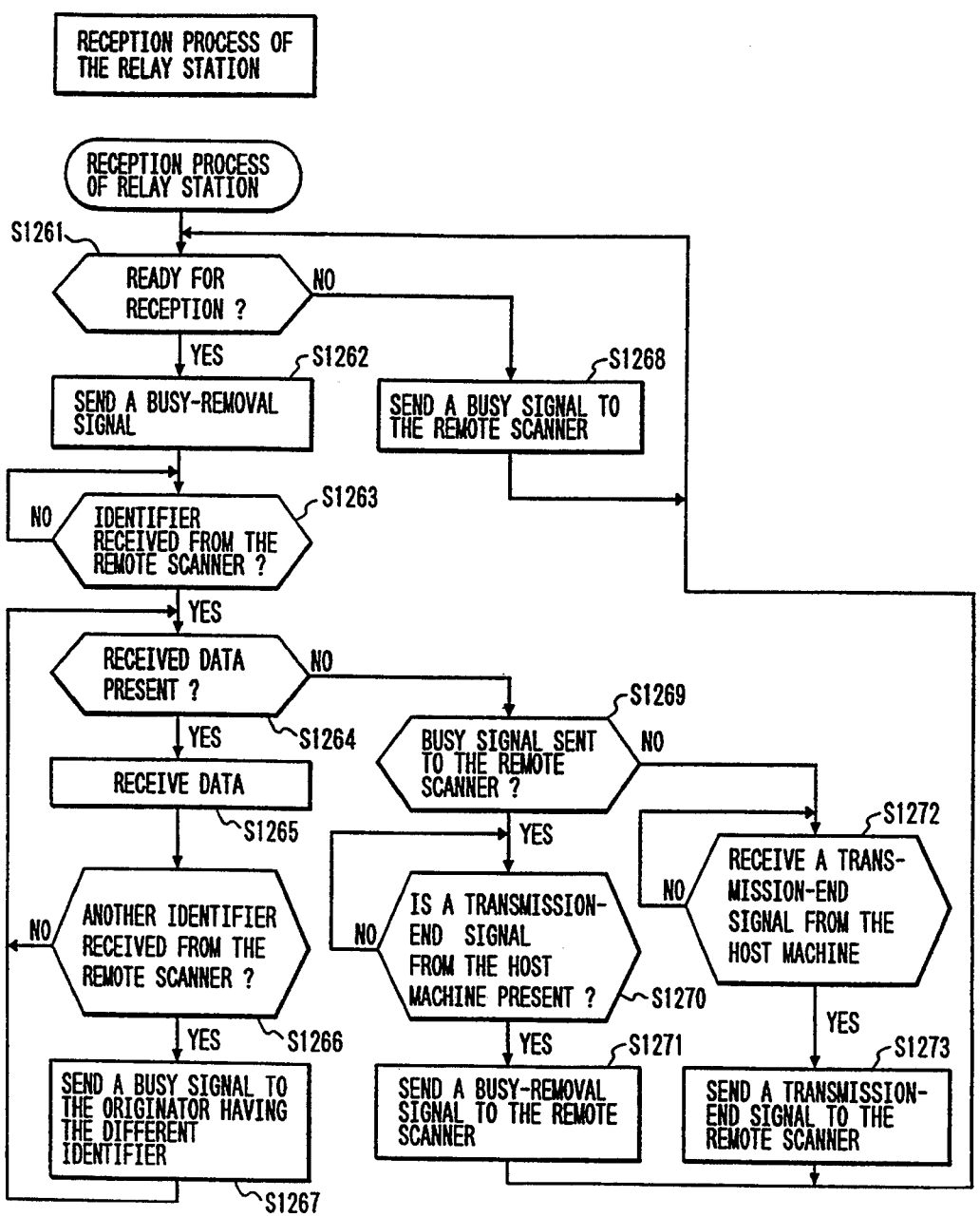
Figure 24:
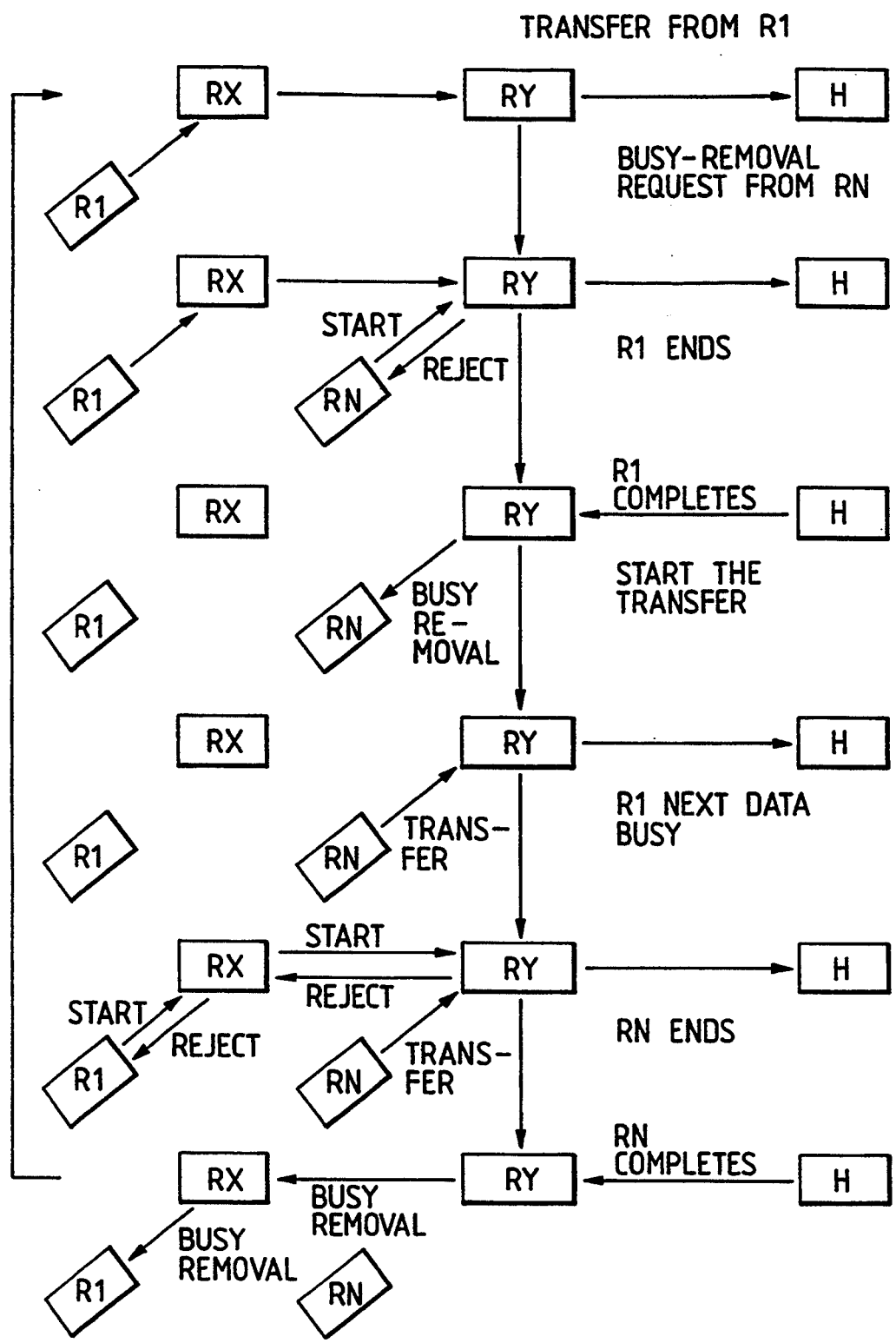

FIGS. 17 and 18 shows flow charts for controlling the reception of image data according to identification data of the handy scanner 1. In the control process of FIGS. 17 and 18, a relay station 1 receives from a handy scanner 1 identification data attached to image data before receiving the image data, and thereafter rejects reception of data from another handy scanner 1 or another relay station 2 having another identification data until the reception of the image data being now transmitted is completed. This operation may be depicted as shown in FIG. 24. A relay station RY monitors identification data from a handy scanner RI or RN. When receiving data from the RI, it rejects data reception from the RN. When receiving data from the RN, it rejects data reception from the RI. These states are denoted as "reject" for the scanner 1 or the relay station 5. In the flowchart, it is described as "Send a busy signal to an originator having another identification data".

The flow chart of FIG. 17 will be described.

At the side of a host machine 2, if it is judged that an identification data is received from a relay station 5 in step S1140, it is judged whether the reception data exists or not in step S1141. If it exists, the host machine 2 receives data from the relay station 5 in step S1142. Subsequently, it is judged whether the host machine 2 receives another identification data from another relay station 5, or not, in step S1143. If yes, the host machine 2 sends a busy signal to the originator (another relay station 5) having another identification data in step S1144. On the other hand, if no in step S1143, the host machine 2 sends a busy removal-signal to the relay station 5 in step S1145. When it is judged that received data does not exist in step S1141, it is judged whether the host machine 2 sends a busy signal to the relay station 5, or not in step S1146. If yes, it sends a busy-removal signal to the relay station 5 whereas if no, send a transmission-completion signal.

At the side of a handy scanner 1, it sends an identification signal of itself to the relay station 5 in step S1340, and it is judged whether the relay station is busy or not in step S1341. If no, the handy scanner 1 starts data transmission to the relay station 5 in step S1343, and it is judged that the transmission is completed in step S1344, the handy scanner 1 sends a transmission-completion signal to the relay station 2 in step S1345. When the relay station 5 is busy in step S1341, it is judged whether the handy scanner 1 receives the busy-removal signal, or not in step S1342. If yes, process goes to step S1343.

Next, FIG. 18 shows the flowchart of the operation of a relay station applicable to the embodiment of FIG. 17.

In the transmission process of a relay station 5, it is judged whether a transmission data exists or not in step S1281. If yes, it is judged whether a host machine 2 is ready for receiving data from the relay station 5 in step S1282. If yes, the relay station 5 sends an identification data received from a handy scanner 1 in step S1283. Subsequently, if it is judged whether the relay station 5 receives a data reception-rejection (busy) signal from the host machine 2, or not, in step S1284. If yes, in step S1285, the relay station 5 waits until it receives a data reception-rejection removal signal from the host machine 2 in step S1285. After receiving the removal signal, the relay station 5 transmits the data to the host machine 2 in step S1286. In step S1287, if the data is now transmitted from the relay station 5 to the host machine in step S1287, process goes back to step S1286. On the other hand, if the data transmission is completed, the relay station 5 sends a transmission-completion signal to the host machine 2 in step S1288.

In a data reception process of a relay station 5, it is judged whether the relay station 5 is ready for receiving data from a handy scanner 1, or not in step S1261. If yes, the relay station 5 sends a data reception-rejection removal signal to the handy scanner 1 in step S1262, and then it is judged whether it receives an identification data from the handy scanner 1 directly or another relay station 5, or not in step S1263. If it receives the identification data, and it is judged that there exists data to be received in step S1264, the relay station 5 receives the data in step S1265. Subsequently, in step S1266, it is judged whether the relay station 5 receives another identification data from another handy scanner 1 or another relay station 5, or not. If yes, it sends a data-reception rejection signal to another handy scanner 1 or another relay station 5 in step S1267.

On the other hand, if it is judged that the relay station 5 is not ready for receiving data in step S1261, it sends a data-reception rejection signal to the handy scanner 1 or another relay station 5 in step S1268. In step S1264, if it is judged that there does not exist a reception data in step S1264, then process goes to step S1269 in which it is judged whether it sends a data-reception rejection signal to the handy scanner 1,or not. If yes, the relay station 5 waits until it receives a transmission-completion signal from the host machine 2 in step S1269. When it receives the transmission-completion signal, it sends a data-reception rejection removal signal to the handy scanner 1 or another relay station 5 in step S1271. When it is judged that the relay station 5 does not transmit the data-reception rejection signal to the handy scanner 1, it waits until it receives the transmission-completion signal from the host machine 2 in step S1272, and when receiving the transmission-completion signal, the relay station 5 sends a transmission-completion signal to the handy scanner 2 in step S1273.

6) Image Data Storage by All the Relay Stations

When the remainder of the memory capacity of the image memory in the host machine 2 becomes smaller, the image memory 75 of the relay station 5 provided near the host machine 2 is first used for storing the image data in a memory mode. When such an amount of image data as to exceed the memory capacity of all the memories of the relay stations 5 up to the relay station 5 directly receiving image data from the handy scanner 1, counted from the host machine 2, is transmitted, data transmission to the remote scanner 1 is interrupted in a memory-full mode of a relay station. The relay station 5 is designed so as to allow the bidirectional transfer of data. This apparently increases the memory capacity. In a case where the image memory 75 of the poststage relay station 5 becomes full while receiving data from the handy scanner 1 in a memory-full mode, the mode is changed from a memory reverse mode to a through reverse mode so that image data is transmitted to the prestage relay station 5. The relay station 5 which is receiving data from the poststage relay station 5 in a through reverse mode is placed to a memory reverse mode and stores the data into the image memory therein. When the memory of this relay station 5 is full, this relay station 5 is also in a through reverse mode, and transmits data to a further prestage relay station 5. When an initial stage relay station 5 is in a memory-full state, the transfer-interruption signal is successively transferred to the subsequent stage relay stations 5. A relay station 5 which is receiving data from the scanner 1 sends a transmission-interrupt signal to the scanner 1. When the memory-full state of the host machine 2 is removed and an interrupt-removal signal is transmitted from the host machine 2, the relay station 5 near the host machine 2 first sends data blocks of the image memory to the host machine 2, and then the subsequent relay stations 5 do the same.

Figure 25:
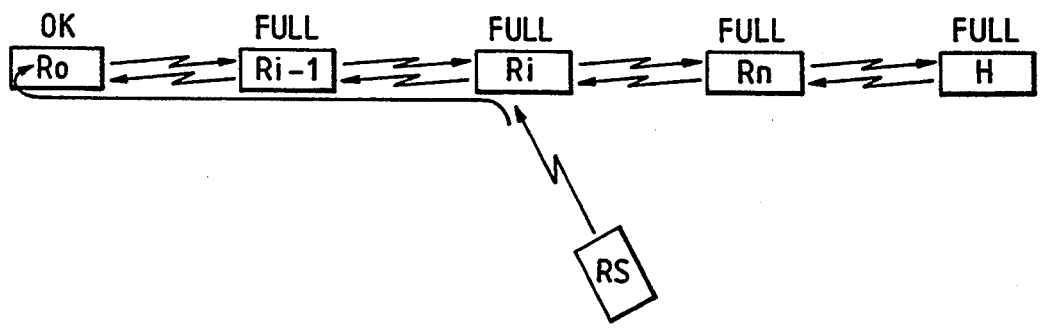

FIGS. 20 and 22 are flow charts showing the control processes that are performed when a relay station 5 near the host machine 2 is in a memory-full state, image data is stored in the image memory 75 of the preceding stage relay stations 5 in successive order, as shown in FIG. 25. In FIG. 25, reference marks Ro, Ri-1, Ri, Rn denotes a relay station 5, respectively, RS is a handy scanner, and H is a host machine. In FIGS. 20 and 22, the transmission process and the reception process are separately described. When the control processes are realized by software technique, those processes may be described into different tasks. To be more specific, in the transmission process, control monitors an operating state of the host machine 1 and if there is present the data to be transmitted in the image memory 75 in the relay station 5. If the data to be transmitted is present and the host machine 1 is ready for transmission, data is transmitted till the image memory 75 is empty. The data transmission is performed in an asychronism with the reception operation. Similarly, the reception operation is performed independently of the transmission operation. In the reception operation, control monitors the content of the memory to check whether or not a received signal is present. The control of the relay station 5 contains data transmission steps (a) to (g) shown in FIG. 20. Then, in addition to the memory in the relay station 5 located between the host machine 2 and the scanner 1, the memories in other relay stations 5 can be used for storing image data. As shown in FIG. 20, the image memory of the relay station 5 is divided into some blocks. When one block of the image memory is full, the image data of the next stage relay station 5 or the scanner 1 is transferred to the prestage. The relay station 5 on the left side is still in a reception-ready state and can receive image data through the middle relay station 5. When the relay station 5 becomes full, it sends a memory-full signal to the scanner 1 through the relay station 5.

Figure 19:
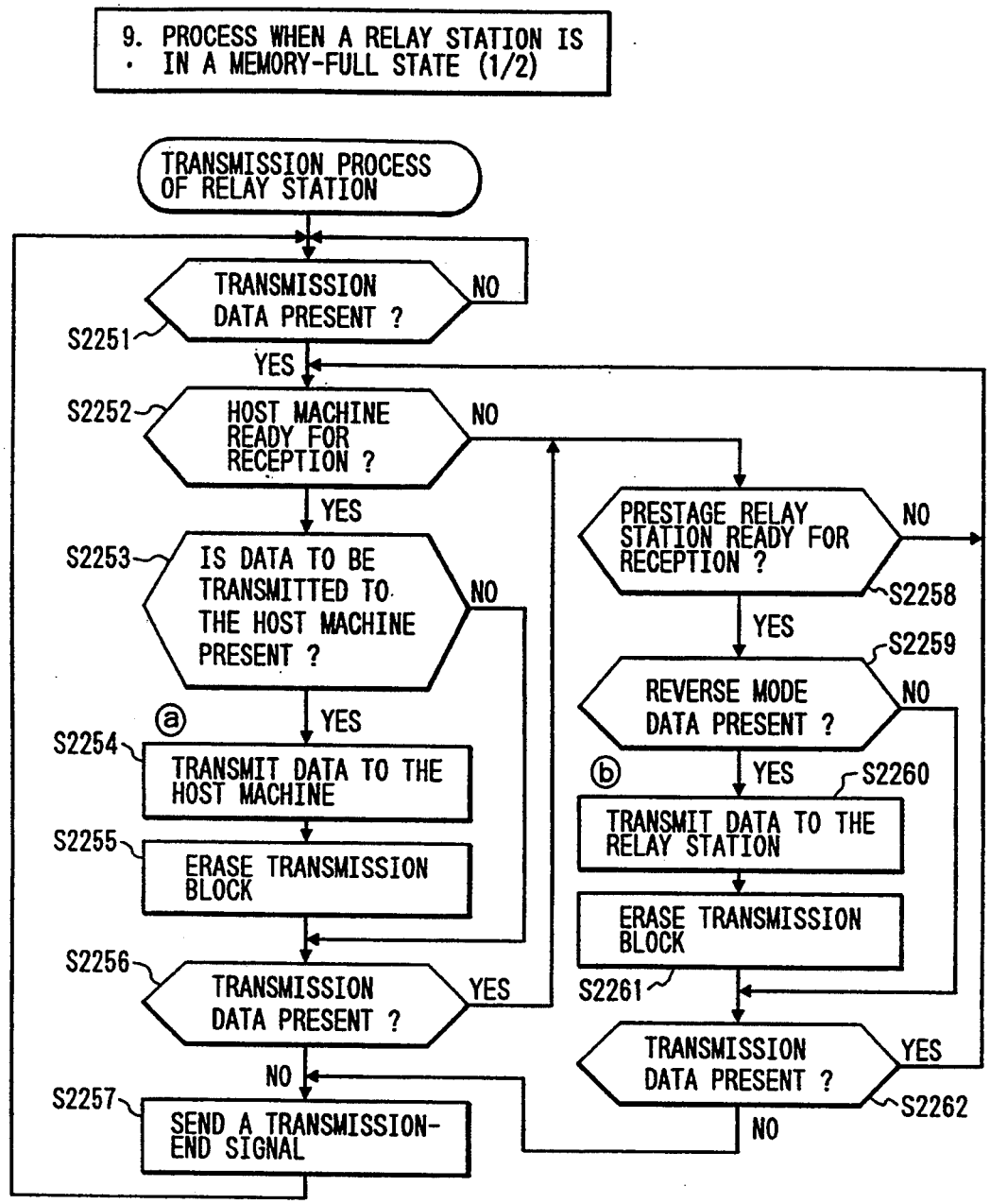
FIGS. 19 and 21 are flowcharts showing the operation of the relay station in a memory-full mode of the relay station, respectively.

The flow chart of a relay station 5 will be described with reference to FIG. 19.

In step S2251, it is judged whether there exists transmission data in a relay station 5, or not. If yes, it is judged whether a host machine 2 is ready for receiving the data from the relay station 5, or not in step S2252. If yes, it is judged whether there exists data to be transmitted to the host machine 2, or not in step S2253. If yes, the relay station 5 transmits the data to the host machine 2 in step S2254, and erases the transmitted data from the image memory 75 of the relay station 5 in step S2255. Subsequently, in step S2256, it is judged whether there exists transmission data in the image memory 75, or not in step S2256. If no, the relay station 5 sends a transmission-completion signal to the host machine 2. On the other hand, if yes in step S2256 or no in step S2252, it is judged whether a prestage relay station 5 is ready for receiving the data, or not in step S2258. If yes, it is judged whether there exists a reverse mode data, or not in step S2259. If yes, the relay station 5 sends a transmission data block to the prestage relay station 5 in step S2260, and erases the transmitted data block in the image memory 75 of the relay station 5 in step S2261. Subsequently, in step S2262, it is judged whether there exists transmission data in the image memory 75, or not. If no, process goes to step S2257 whereas if yes, process goes back to step S2252.

Figures 21, 21A:
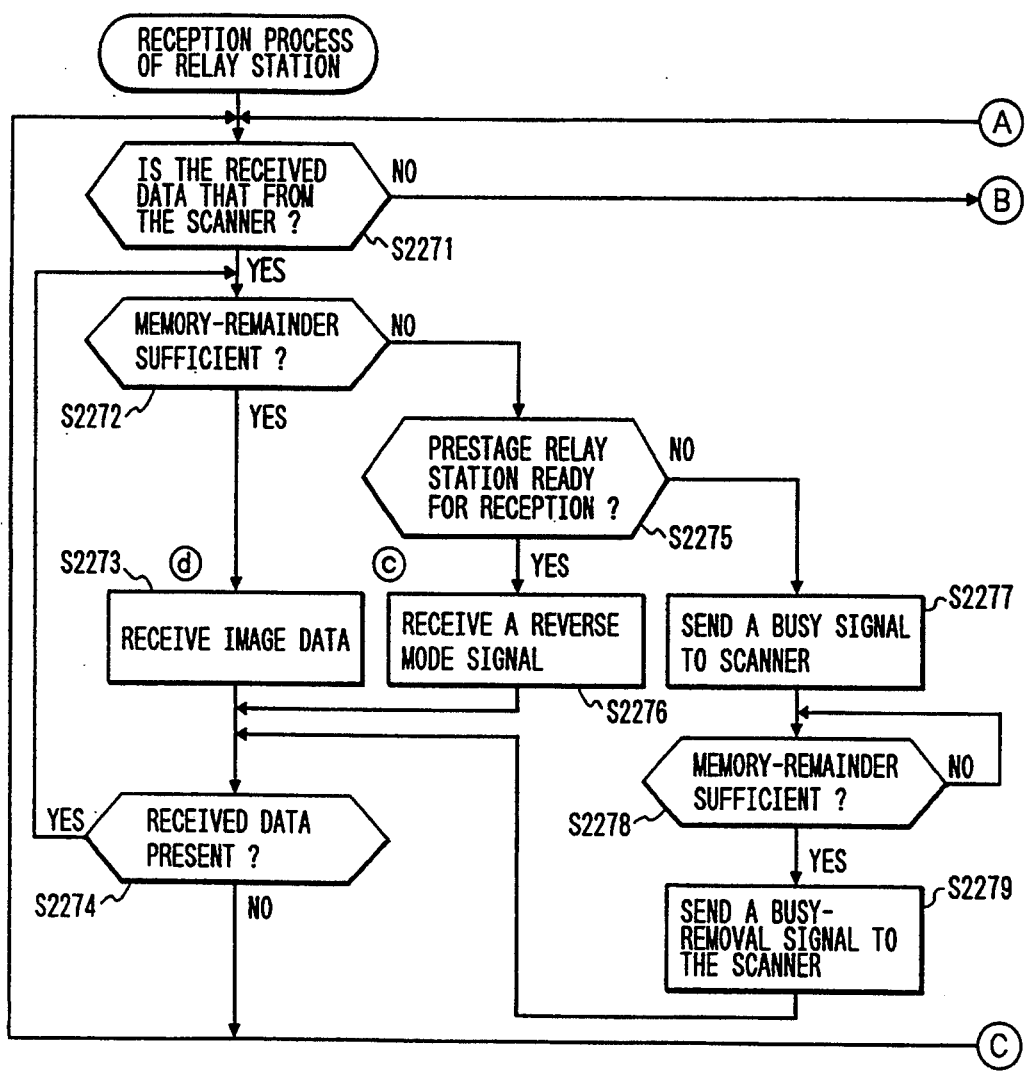
Figure 21B:
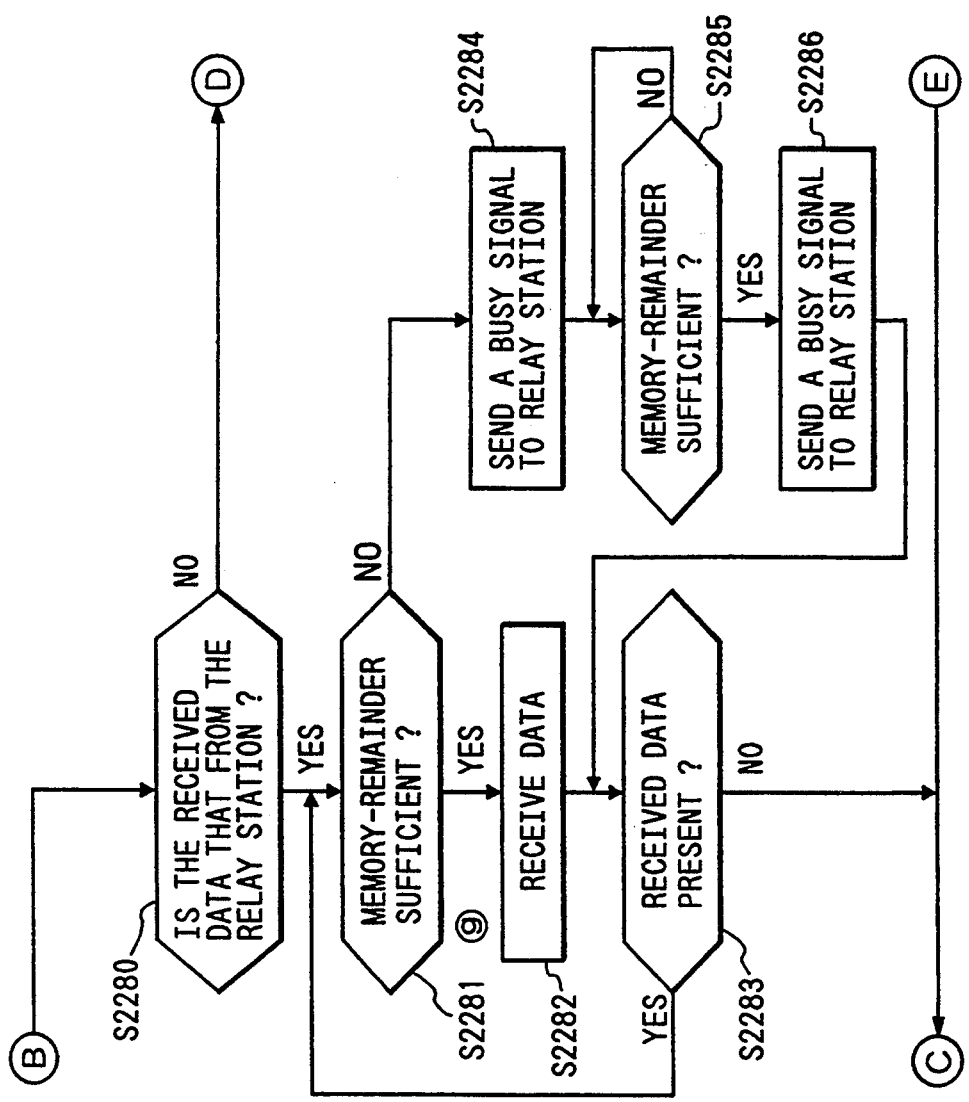
Figure 21C:
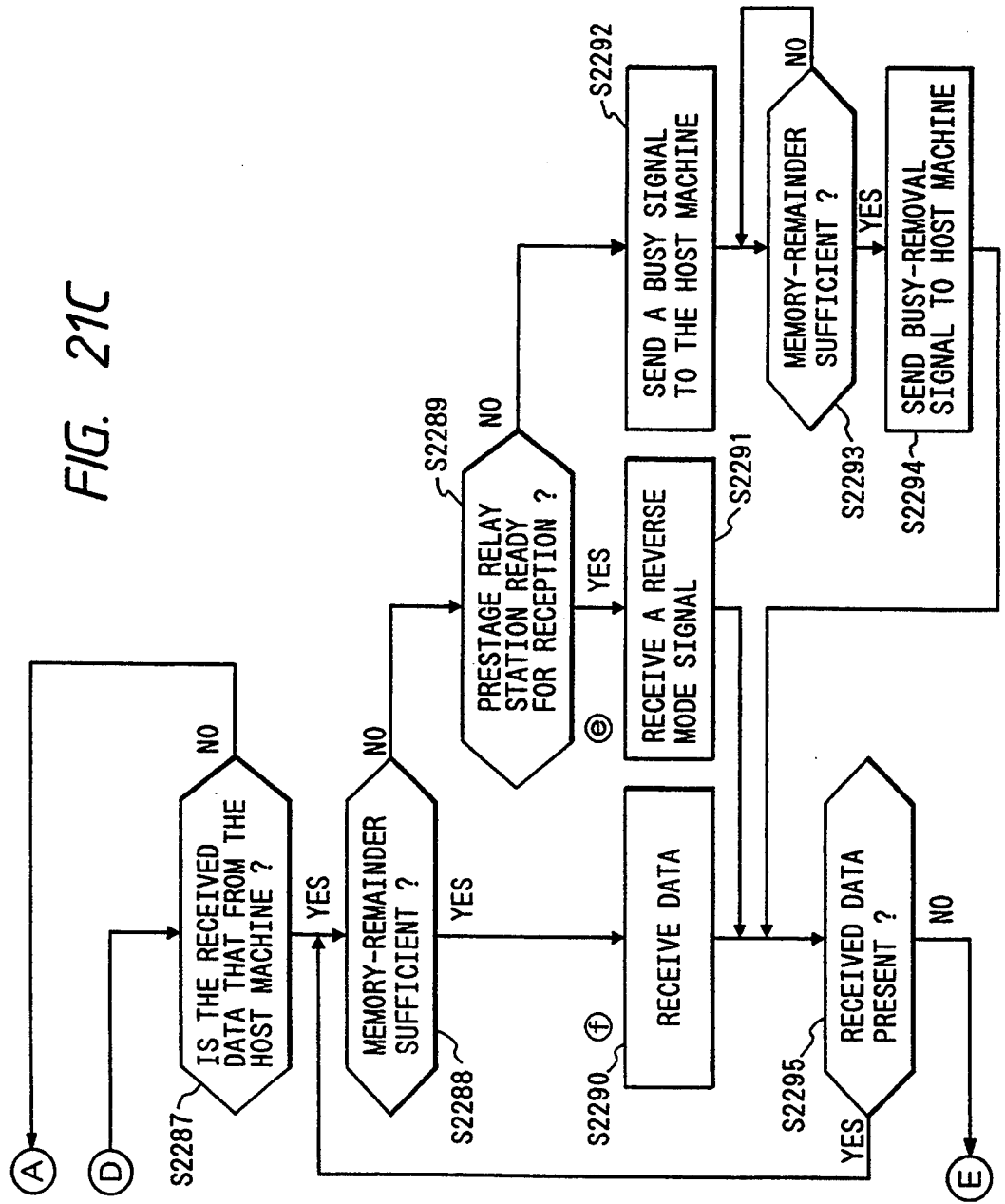

Next, the flow chart of a relay station 5 will be described with reference to FIG. 21.

In step S2271, it is judged whether the relay station 5 receives data from a handy scanner 1, or not. If yes, it is judged whether the memory-remainder of the image memory 75 is sufficient, or not in step S2272. If yes, the relay station 5 receives the data from the handy scanner 1 in step S2273, and it is judged whether there exists reception data, or not in step S2274. If yes, process goes back to step S2272. When it is judged that the memory-remainder of the image memory 75 is insufficient in step S2272, it is judged whether a prestage relay station 5 is ready for receiving the data from the scanner 1, or not in step S2275. If yes, it receives a reverse mode in step S2276, and goes to step S2274. When the prestage relay station 5 is not ready for data reception in step S2275, the relay station 5 sends a transmission-rejection (busy) signal to the scanner 1 in step S2277, and the relay station 5 waits until the memory-remainder of the image memory 75 becomes sufficient in step S2278. When sufficient, then the relay station 5 sends a transmission-rejection removal signal to the scanner 1 in step S2279.

When it is judged that the relay station 5 does not receive data from the scanner 1 in step S2271, it is judged whether it receives data from another relay station 5, or not in step S2280. If yes, the memory-remainder of the image memory 75 of the relay station 5 is sufficient in step S2281, the relay station 5 receives the data from another relay station 5 in step S2282, and thereafter it is judged whether there exists reception data, or not in step S2283. If yes, process goes back to step S2281.

When the relay station 5 does not receive data for another relay station 5 in step S2280, it is judged whether the relay station 5 receives the data from the host machine 2, or not in step S2287. If yes, it is judged whether the memory-remainder of the image memory 75 in the relay station 5 is sufficient, or not in step S2288. If yes, the relay station 5 receives the data from the host machine 2 in step S2290, and it is judged whether there exists reception data, or not in step S2295. If yes, process goes back to step S2288.

When the memory-remainder of the image memory 75 is insufficient in step S2288, it is judged whether the prestage relay station 5 is ready for receiving the data, or not in step S2289. If yes, the relay station receives a reverse mode, and goes to step S2295.

When it is judged that the prestage relay station 5 is not ready for reception in step S2289, the relay station 5 sends the transmission-rejection signal to the host machine 2 in step S2292, and it waits until the memory-remainder of the image memory 75 becomes sufficient in step S2293. When sufficient, it sends the transmission-rejection removal signal to the host machine 2 in step S2293, and goes to step S2295. If no in step S2274, 2283 or 2295, process goes back to step S2272.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A facsimile machine for facsimile communication with another facsimile machine, comprising:
   a host machine including processing means for processing data;
   at least one handy-scanner provided separately from said host machine, for scanning an original document, said handy-scanner including read means for reading image data from said original document, and first transmitting means for transmitting the image data read by said read means; and at least one relay station for relaying data signals between said host machine and said handy-scanner, said relay station including second transmitting means for transmitting the data received from said first transmitting means of said handy-scanner to said host machine, and a buffer memory for temporarily storing the image data before said second transmitting means transmits the image data to said host machine, said host machine processing the image data transmitted by said second transmitting means.

2. A facsimile machine as claimed in claim 1, wherein said first transmitting means wirelessly transmits the data in the form of light signals.

3. A facsimile machine as claimed in claim 1, wherein said second transmitting means wirelessly transmits the data in the form of light signals.

4. A facsimile machine as claimed in claim 1, wherein said host machine further includes memory means for storing the image data to be processed by said processing means, and first memory-remainder detecting means for detecting a remaining memory capacity of said memory means;

wherein said buffer memory of said relay station stores the data according to a detection signal of said first memory-remainder detecting means.

5. A facsimile machine as claimed in claim 4, wherein said buffer memory of said relay station stores the data when said first memory-remainder detecting means detects that the remaining memory capacity of said memory means is insufficient to store the image data to be transmitted by said second transmitting means to said host machine.

6. A facsimile machine as claimed in claim 1, wherein said host machine further includes a plurality of receiving terminals, provided separately from said host machine, for receiving the image data transmitted to said host machine and transmitting the received image data to said host machine in a wire communication mode, and selecting means for selecting one of said receiving terminals according to the levels of the signals received by said receiving terminals.

7. A facsimile machine as claimed in claim 1, wherein said relay station is constituted by a plurality of relay stations, each of said relay stations further including third transmitting means for transferring the image data received from the first transmitting means, to another relay station.

8. A facsimile machine as claimed in claim 7, wherein each of said relay stations includes select means for selecting one of said second transmitting means and said third transmitting means.

9. A facsimile machine as claimed in claim 8, wherein said relay stations further includes second memory-remainder detecting means for detecting a remaining memory capacity of said buffer memory, and said select means selects one of said second transmitting means and said third transmitting means according to a detect signal of said second memory-remainder detecting means.

10. A facsimile machine as claimed in claim 8, wherein said host machine further includes memory means for storing the image data to be processed by said processing means, and first memory-remainder detecting means for detecting a remaining memory capacity of said memory means, wherein said select means selects one of said second transmitting means and said third transmitting means according to a detect signal of said first memory-remainder detecting means.

11. A facsimile machine as claimed in claim 8, wherein said relay station further includes third memory-remainder detecting means for detecting a remaining memory capacity of said buffer memory of another relay station, and said select means for selecting one of said second transmitting means and said third transmitting means according to a detection signal of said third memory-remainder detecting means.

12. A facsimile machine for performing facsimile communication, comprising:

a host machine including processing means for processing data, memory means for storing the image data to be processed by said processing means, and third memory-remainder detecting means for detecting a remaining memory capacity of said memory means;

a handy-scanner provided separately from said host machine, said handy-scanner including read means for reading image data from an original document, and first transmitting means for transmitting image data read by said read means; and a plurality of relay stations for relaying data signals between said host machine and said handy-scanner, each of said relay stations including second transmitting means for transmitting the image data received from said first transmitting means, to said host machine, a buffer memory for temporarily storing the image data before said second transmitting means transmits the image data, third transmitting means for transmitting the image data received from the first transmitting means, to another relay station, first memory-remainder detecting means for detecting a remaining memory capacity of said buffer memory, second memory-remainder detecting means for detecting a remaining memory capacity of said buffer memory of another relay station, and select means for selecting one of said second transmitting means and said third transmitting means according to a detection signal of said first, second and third memory-remainder detecting means.

13. A facsimile machine as claimed in claim 12, wherein said first transmitting means wirelessly transmits the data in the form of light signals.

14. A facsimile machine as claimed in claim 12, wherein said second and third transmitting means wirelessly transmit the data in the form of light signals.

15. A facsimile machine as claimed in claim 12, wherein when one of said relay station receives the image data from said host machine, said selection means of said one relay station selects said third transmitting means, provided that it is determined according to detection signals of said first and third memory-remainder detecting means that the remaining memory capacities of said buffer memory of said relay station and said memory means of said host machine are insufficient to store the image data, and that it is determined according to detection signals of said second memory-remainder detecting means that said buffer memory of another relay station has a memory capacity enough to store the image data.

* * * * *

UNITED STATES PATENT AND TRADEMARK OFFICE
CERTIFICATE OF CORRECTION

PATENT NO. : 5,392,132
DATED : February 21, 1995
INVENTOR(S) : Taiji YAMAMOTO et al It is certified that error appears in the above-indentified patent and that said Letters Patent is hereby corrected as shown below:

ON THE TITLE PAGE:

Attorney, Agent, or Firm after "Henderson" insert --,--.

Claim 9, Column 19, Line 57 change "includes" to --include--.

Claim 15, Column 20, Line 55 change "station" to --stations--.

Signed and Sealed this

Fourth Day of July, 1995

Attest:

BRUCE LEHMAN

*Attesting Officer*  *Commissioner of Patents and Trademarks*